(12) United States Patent
Wu

(10) Patent No.: US 9,519,587 B2
(45) Date of Patent: Dec. 13, 2016

(54) PRE-READING FILE CONTAINERS STORING UNREAD FILE SEGMENTS AND SEGMENTS THAT DO NOT BELONG TO THE FILE

(71) Applicant: Huawei Technologies Co., Ltd., Shenzhen (CN)

(72) Inventor: Jian Wu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 155 days.

(21) Appl. No.: 14/524,407

(22) Filed: Oct. 27, 2014

(65) Prior Publication Data

US 2015/0046659 A1 Feb. 12, 2015

Related U.S. Application Data

(63) Continuation of application No. PCT/CN2013/077682, filed on Jun. 21, 2013.

(51) Int. Cl.
*G06F 12/00* (2006.01)
*G06F 12/08* (2016.01)
*G06F 17/30* (2006.01)

(52) U.S. Cl.
CPC ..... *G06F 12/0862* (2013.01); *G06F 17/30091* (2013.01); *G06F 17/30132* (2013.01); *G06F 17/30159* (2013.01); *G06F 2212/602* (2013.01)

(58) Field of Classification Search
CPC ............ G06F 12/0862; G06F 2212/602; G06F 9/30047
USPC ........................................................ 711/137
See application file for complete search history.

(56) References Cited

U.S. PATENT DOCUMENTS

| | | | |
|---|---|---|---|
| 7,908,436 B1 | 3/2011 | Srinivasan et al. | |
| 8,074,043 B1 | 12/2011 | Zeis | |
| 8,370,315 B1 | 2/2013 | Efstathopoulos et al. | |
| 2003/0018849 A1* | 1/2003 | Takaichi | G06F 3/0601 711/113 |
| 2005/0114289 A1 | 5/2005 | Fair | |
| 2005/0114608 A1* | 5/2005 | Oshima | G06F 12/0862 711/137 |

(Continued)

FOREIGN PATENT DOCUMENTS

| | | |
|---|---|---|
| CN | 1945552 A | 4/2007 |
| CN | 102521349 A | 6/2012 |

OTHER PUBLICATIONS

Ganesan, P., et al., "Read Performance Enhancement in Data Deduplication for Secondary Storage," May 2013, 50 pages.
Foreign Communication From a Counterpart Application, European Application No. 13882624.3, Extended European Search Report dated May 20, 2015, 9 pages.
Partial English Translation and Abstract of Chinese Patent Application No. CN102521349A, Nov. 20, 2014, 3 pages.

(Continued)

*Primary Examiner* — Sean D Rossiter
(74) *Attorney, Agent, or Firm* — Conley Rose, P.C.

(57) ABSTRACT

A file reading method, storage device, and reading system, relating to the field of file reading. The method includes receiving, by a storage device, a first read request sent by a client, where to-be-read data requested by the first read request is a part of the file; reading, from a cache, data that is of the to-be-read data and located in the cache, and reading, from a first storage medium, data that is of the to-be-read data and not located in the cache; and pre-reading, from the first storage medium, data in at least one of the containers, and storing the pre-read data into the cache, where the pre-read container includes at least one unread file segment of the file.

19 Claims, 8 Drawing Sheets

(56) References Cited

U.S. PATENT DOCUMENTS

| | | | |
|---|---|---|---|
| 2005/0138091 A1 | 6/2005 | Bono | |
| 2008/0071795 A1* | 3/2008 | Fujiwara | G06F 17/30038 |
| 2013/0018851 A1 | 1/2013 | Jayaraman et al. | |
| 2013/0339617 A1* | 12/2013 | Averbouch | G06F 12/0862 |
| | | | 711/133 |
| 2014/0115257 A1* | 4/2014 | Dundas | G06F 12/0862 |
| | | | 711/125 |
| 2014/0229682 A1* | 8/2014 | Poremba | G06F 12/0862 |
| | | | 711/137 |
| 2015/0046659 A1* | 2/2015 | Wu | G06F 17/30159 |
| | | | 711/137 |
| 2015/0378745 A1* | 12/2015 | He | G06F 9/4401 |
| | | | 711/137 |

OTHER PUBLICATIONS

Foreign Communication From a Counterpart Application, PCT Application No. PCT/CN2013/077682, English Translation of International Search Report dated Mar. 27, 2014, 2 pages.

Foreign Communication From a Counterpart Application, PCT Application No. PCT/CN2013/077682, Written Opinion dated Mar. 27, 2014, 5 pages.

Lillibridge, M., et al., "Improving Restore Speed for Backup Systems that Use Inline Chunk-Based Deduplication," 11th USENIX Conference on File and Storage Technologies, pp. 183-197.

Foreign Communication From a Counterpart Application, European Application No. 13882624.3, European Office Action dated Oct. 24, 2016, 12 pages.

* cited by examiner

PRE-READING FILE CONTAINERS STORING UNREAD FILE SEGMENTS AND SEGMENTS THAT DO NOT BELONG TO THE FILE

CROSS-REFERENCE TO RELATED APPLICATIONS

This application is a continuation of International Application No. PCT/CN2013/077682, filed on Jun. 21, 2013, which is hereby incorporated by reference in its entirety.

TECHNICAL FIELD

The present invention relates to the field of file reading and writing, and in particular, to a file reading method, storage device, and reading system.

BACKGROUND

The data de-duplication technology is widely used in the storage field. For example, in a backup system, the data de-duplication technology is used to sequentially read chunks of a specific size in a file to be backed up and to search whether a same chunk exists in previously backed up chunks. If there is a backed up chunk that is the same as a chunk to be backed up, the chunk is not backed up; instead, the file to be backed up references the previously backed up chunk. Only a chunk that is not found is backed up. A file that references the previously backed up chunk is called a data de-duplication file. The backed up chunk in a storage system is called a duplication chunk.

Previously backed up chunks are referenced, and the referenced chunks are backed up at multiple times. Therefore, physical locations of the chunks that are included in the de-duplication file, that is, the chunks that constitute the de-duplication file are normally non-contiguous on a disk. Accordingly, a process of reading the de-duplication file is actually a process of reading data from the disk including data fragments. All chunks may be read from the disk after several disk seeks. A reading speed of the disk is slow and therefore a time overhead used during the reading process increases. To resolve this problem, the prior art provides a method for reading a de-duplication file. An additional storage device is used as a cache in this method, and all backed up duplication chunks are stored in the additional storage device. When a de-duplication file is read, corresponding duplication chunks are read from the additional storage device as long as read chunks reference a backed up chunks.

During implementation of the present invention, the inventor finds that the prior art has the following problem.

Because the number of the backed up duplication chunks is large, capacity of the storage device in use is huge. To ensure the reading speed, performance of the storage device is required to be higher than that of the disk. A commonly used additional storage device is a Solid State Disk (SSD), but a price of the SSD is high. Therefore, hardware costs increase.

SUMMARY

To save hardware costs and improve file reading performance, embodiments of the present invention provide a file reading method, storage device, and reading system. Technical solutions are as follows.

According to a first aspect, an embodiment of the present invention provides a file reading method, applicable to reading of a file stored on a storage device, where the storage device includes a first storage medium and a cache. An access speed of the cache is greater than that of the first storage medium, the first storage medium has a plurality of storage containers, and the file includes a plurality of file segments. The method includes receiving, by the storage device, a first read request sent by a client, where to-be-read data requested by the first read request is a part of the file; reading, from the cache, data that is of the to-be-read data and located in the cache, and reading, from the first storage medium, data that is of the to-be-read data and not located in the cache; and pre-reading, from the first storage medium, data in at least one of the containers, and storing the pre-read data into the cache, where the pre-read container includes at least one unread file segment of the file.

Optionally, the pre-reading, from the first storage medium, data in at least one of the containers, and storing the pre-read data into the cache includes pre-reading, from the first storage medium and among containers in which a predetermined number of unread file segments are located, data in the container in which the number of the predetermined number of file segments is greater than a threshold, and storing the pre-read data into the cache.

Optionally, the method further includes selecting, from the predetermined number of unread file segments, unread file segments in a container in which the number of unread file segments is not greater than the threshold, and pre-reading the selected unread file segments and storing the pre-read unread file segments into the cache.

Optionally, the pre-reading, from the first storage medium and among containers in which a predetermined number of unread file segments are located, data in a container in which the number of the predetermined number of file segments is greater than a threshold includes acquiring a first address pointer, where the first address pointer points to a last file segment in file segments corresponding to the to-be-read data; acquiring, from an address pointer table of the file, a predetermined number of address pointers that follow the first address pointer; and collecting, in containers in which file segments to which the acquired address pointers point are located, statistics for the number of times that the predetermined number of address pointers point to each of the containers; and determining whether the number of the times acquired by statistics collection is greater than the threshold, and if the number of the times acquired by statistics collection is greater than the threshold, pre-reading data in a container in which the number of the times is greater than the threshold.

Optionally, the pre-reading, from the first storage medium, data in at least one of the containers, and storing the pre-read data into the cache includes pre-reading, from the first storage medium, data in a container in which a predetermined number of unread file segments are located, and storing the pre-read data into the cache.

Optionally, the pre-reading, from the first storage medium, data in a container in which a predetermined number of unread file segments are located includes acquiring a first address pointer, where the first address pointer points to a last file segment in file segments corresponding to the to-be-read data; acquiring, from an address pointer table of the file, a predetermined number of address pointers that follow the first address pointer; and pre-reading data in a container in which file segments to which the acquired address pointers point are located.

Optionally, the pre-reading, from the first storage medium, data in at least one of the containers, and storing the pre-read data into the cache includes pre-reading, from the first storage medium according to a sequence of serial numbers of containers in which a predetermined number of unread file segments are located, data in at least one of the containers in which the predetermined number of file segments are located, and storing the pre-read data into the cache.

Optionally, the pre-reading, from the first storage medium according to a sequence of serial numbers of containers in which a predetermined number of unread file segments are located, data in at least one of the containers in which the predetermined number of file segments are located, and storing the pre-read data into the cache includes acquiring a first address pointer, where the first address pointer points to a last file segment in file segments corresponding to the to-be-read data; acquiring, from an address pointer table of the file, a predetermined number of address pointers that follow the first address pointer; and pre-reading, according to a sequence of serial numbers of containers in which file segments to which the acquired address pointers point are located, data in at least one of the containers in which the file segments to which the acquired address pointers point are located.

Optionally, the acquiring, from an address pointer table of the file, a predetermined number of address pointers that follow the first address pointer includes, in the address pointer table of the file, taking the first address pointer as a start pointer, and determining whether the number of all address pointers that follow the first address pointer is not greater than a predetermined number; if the number of all the address pointers that follow the first address pointer is greater than the predetermined number, acquiring all the address pointers that follow the first address pointer; and if the number of all the address pointers that follow the first address pointer is not greater than the predetermined number, acquiring the predetermined number of address pointers.

Optionally, the predetermined number of unread file segments are contiguous in the file, and the predetermined number of unread file segments are adjacent to file segments corresponding to the to-be-read data in the file.

Optionally, the first read request is a read request that satisfies a pre-read trigger condition, where the pre-read trigger condition includes one or more of the following conditions: time when the storage device receives the first read request falls within a predetermined time period; the to-be-read data requested by the first read request does not exist in the cache, or a part of the to-be-read data requested by the first read request does not exist in the cache; and after the storage device reads the to-be-read data requested by the first read request, the number of unread file segments that are in the cache and pertain to the file is less than a preset number.

Optionally, the first read request is a read request that satisfies a pre-read trigger condition, where the pre-read trigger condition includes one or more of the following conditions: time when the storage device receives the first read request falls within a predetermined time period; the to-be-read data requested by the first read request does not exist in the cache, or a part of the to-be-read data requested by the first read request does not exist in the cache; after the storage device reads the to-be-read data requested by the first read request, the number of unread file segments that are in the cache and pertain to the file is less than a preset number; and file segments corresponding to the to-be-read data requested by the first read request are unread file segments except the predetermined number of unread file segments during a previous pre-reading.

Optionally, the method further includes receiving, by the storage device, a second read request sent by the client, where to-be-read data requested by the second read request is a part of the file; reading, from the cache, data that is of the to-be-read data requested by the second read request and that is located in the cache; and reading, from the first storage medium, data that is of the to-be-read data requested by the second read request and that is not located in the cache.

According to a second aspect, an embodiment of the present invention provides a file storage device, where the storage device is configured to store a file, and the storage device includes a first storage medium and a cache; an access speed of the cache is greater than that of the first storage medium, the first storage medium has a plurality of storage containers, and the file includes a plurality of file segments. The storage device includes a receive module, configured to receive a first read request sent by a client, where to-be-read data requested by the first read request is a part of the file; a reading module, configured to read, from the cache, data that is of the to-be-read data and located in the cache, and read, from the first storage medium, data that is of the to-be-read data and not located in the cache; and a pre-reading module, configured to pre-read, from the first storage medium, data in at least one of the containers, and store the pre-read data into the cache, where the pre-read container includes at least one unread file segment of the file.

Optionally, the pre-reading module is configured to pre-read, from the first storage medium and among containers in which a predetermined number of unread file segments are located, data in a container in which the number of the predetermined number of file segments is greater than a threshold, and store the pre-read data into the cache.

Optionally, the pre-reading module is further configured to select, from the predetermined number of unread file segments, unread file segments in a container in which the number of unread file segments is not greater than the threshold, and pre-read the selected unread file segments and store the pre-read unread file segments into the cache.

Optionally, the pre-reading module includes a first acquiring unit, configured to acquire a first address pointer, where the first address pointer points to a last file segment in file segments corresponding to the to-be-read data; a second acquiring unit, configured to acquire, from an address pointer table of the file, a predetermined number of address pointers that follow the first address pointer; a statistics collecting unit, configured to collect, in containers in which file segments to which the acquired address pointers point are located, statistics for the number of times that the predetermined number of address pointers point to each of the containers; and a first pre-reading unit, configured to determine whether the number of the times acquired by statistics collection is greater than the threshold, and if the number of the times acquired by statistics collection is greater than the threshold, pre-read data in a container in which the number of the times is greater than the threshold, and store the pre-read data into the cache.

Optionally, the pre-reading module is configured to pre-read, from the first storage medium, data in a container in which a predetermined number of unread file segments are located, and store the pre-read data into the cache.

Optionally, the pre-reading module includes a third acquiring unit, configured to acquire a first address pointer, where the first address pointer points to a last file segment in file segments corresponding to the to-be-read data; a fourth acquiring unit, configured to acquire, from an address pointer table of the file, a predetermined number of address pointers that follow the first address pointer; and a second pre-reading unit, configured to pre-read data in a container in which file segments to which the acquired address pointers point are located, and store the pre-read data into the cache.

Optionally, the pre-reading module is configured to pre-read, from the first storage medium according to a sequence of serial numbers of containers in which a predetermined number of unread file segments are located, data in at least one of the containers in which the predetermined number of file segments are located, and store the pre-read data into the cache.

Optionally, the pre-reading module includes a fifth acquiring unit, configured to acquire a first address pointer, where the first address pointer points to a last file segment in file segments corresponding to the to-be-read data; a sixth acquiring unit, configured to acquire, from an address pointer table of the file, a predetermined number of address pointers that follow the first address pointer; and a third pre-reading unit, configured to pre-read, according to a sequence of serial numbers of containers in which file segments to which the acquired address pointers point are located, data in at least one of the containers in which the file segments to which the acquired address pointers point are located.

Optionally, the sixth acquiring unit is configured to, in the address pointer table of the file, take the first address pointer as a start pointer, and determine whether the number of all address pointers that follow the first address pointer is not greater than a predetermined number; if the number of all the address pointers that follow the first address pointer is greater than the predetermined number, acquire all the address pointers that follow the first address pointer; and if the number of all the address pointers that follow the first address pointer is not greater than the predetermined number, acquire the predetermined number of address pointers.

Optionally, the predetermined number of unread file segments are contiguous in the file, and the predetermined number of unread file segments are adjacent to file segments corresponding to the to-be-read data in the file.

Optionally, the first read request received by the receive module is a read request that satisfies a pre-read trigger condition, where the pre-read trigger condition includes one or more of the following conditions: time when the receive module receives the first read request falls within a predetermined time period; the to-be-read data requested by the first read request does not exist in the cache, or a part of the to-be-read data requested by the first read request does not exist in the cache; and after the storage device reads the to-be-read data requested by the first read request, the number of unread file segments that are in the cache and pertain to the file is less than a preset number.

Optionally, the first read request received by the receive module is a read request that satisfies a pre-read trigger condition, where the pre-read trigger condition includes one or more of the following conditions: time when the receive module receives the first read request falls within a predetermined time period; the to-be-read data requested by the first read request does not exist in the cache, or a part of the to-be-read data requested by the first read request does not exist in the cache; after the storage device reads the to-be-read data requested by the first read request, the number of unread file segments that are in the cache and pertain to the file is less than a preset number; and file segments corresponding to the to-be-read data requested by the first read request are unread file segments except the predetermined number of unread file segments during a previous pre-reading.

Optionally, the reading module is further configured to receive a second read request sent by the client, where to-be-read data requested by the second read request is a part of the file; and the pre-reading module is further configured to read, from the cache, data that is of the to-be-read data requested by the second read request and that is located in the cache; and read, from the first storage medium, data that is of the to-be-read data requested by the second read request and that is not located in the cache.

According to a third aspect, an embodiment of the present invention provides a file storage device, where the storage device is configured to store a file, and the storage device includes a first storage medium and a cache. An access speed of the cache is greater than that of the first storage medium, the first storage medium has a plurality of storage containers, and the file includes a plurality of file segments. The storage device further includes a processor, and the processor is configured to receive a first read request sent by a client, where to-be-read data requested by the first read request is a part of the file; read, from the cache, data that is of the to-be-read data and located in the cache, and read, from the first storage medium, data that is of the to-be-read data and not located in the cache; and pre-read, from the first storage medium, data in at least one of the containers, and store the pre-read data into the cache, where the pre-read container includes at least one unread file segment of the file.

Optionally, the processor is configured to pre-read, from the first storage medium and among containers in which a predetermined number of unread file segments are located, data in a container in which the number of the predetermined number of file segments is greater than a threshold, and store the pre-read data into the cache.

Optionally, the processor is configured to select, from the predetermined number of unread file segments, unread file segments in a container in which the number of unread file segments is not greater than the threshold, and pre-read the selected unread file segments and store the pre-read unread file segments into the cache.

Optionally, the processor is configured to acquire a first address pointer, where the first address pointer points to a last file segment in file segments corresponding to the to-be-read data; acquire, from an address pointer table of the file, a predetermined number of address pointers that follow the first address pointer; and collect, in containers in which file segments to which the acquired address pointers point are located, statistics for the number of times that the predetermined number of address pointers point to each of the containers; and determine whether the number of the times acquired by statistics collection is greater than the threshold, and if the number of the times acquired by statistics collection is greater than the threshold, pre-read data in a container in which the number of the times is greater than the threshold.

Optionally, the processor is configured to pre-read, from the first storage medium, data in a container in which a predetermined number of unread file segments are located, and store the pre-read data into the cache.

Optionally, the processor is configured to acquire a first address pointer, where the first address pointer points to a last file segment in file segments corresponding to the to-be-read data; acquire, from an address pointer table of the file, a predetermined number of address pointers that follow the first address pointer; and pre-read data in a container in which file segments to which the acquired address pointers point are located.

Optionally, the processor is configured to pre-read, from the first storage medium according to a sequence of serial numbers of containers in which a predetermined number of unread file segments are located, data in at least one of the containers in which the predetermined number of file segments are located, and store the pre-read data into the cache.

Optionally, the processor is configured to acquire a first address pointer, where the first address pointer points to a last file segment in file segments corresponding to the to-be-read data; acquire, from an address pointer table of the file, a predetermined number of address pointers that follow the first address pointer; and pre-read, according to a sequence of serial numbers of containers in which file segments to which the acquired address pointers point are located, data in at least one of the containers in which the file segments to which the acquired address pointers point are located.

Optionally, the processor is further configured to, in the address pointer table of the file, take the first address pointer as a start pointer, and determine whether the number of all address pointers that follow the first address pointer is not greater than a predetermined number; if the number of all the address pointers that follow the first address pointer is greater than the predetermined number, acquire all the address pointers that follow the first address pointer; and if the number of all the address pointers that follow the first address pointer is not greater than the predetermined number, acquire the predetermined number of address pointers.

Optionally, the predetermined number of unread file segments are contiguous in the file, and the predetermined number of unread file segments are adjacent to file segments corresponding to the to-be-read data in the file.

Optionally, the first read request received by the process is a read request that satisfies a pre-read trigger condition, where the pre-read trigger condition includes one or more of the following conditions: time when the storage device receives the first read request falls within a predetermined time period; the to-be-read data requested by the first read request does not exist in the cache, or a part of the to-be-read data requested by the first read request does not exist in the cache; and after the storage device reads the to-be-read data requested by the first read request, the number of unread file segments that are in the cache and pertain to the file is less than a preset number.

Optionally, the first read request received by the processor is a read request that satisfies a pre-read trigger condition, where the pre-read trigger condition includes one or more of the following conditions: time when the storage device receives the first read request falls within a predetermined time period; the to-be-read data requested by the first read request does not exist in the cache, or a part of the to-be-read data requested by the first read request does not exist in the cache; after the storage device reads the to-be-read data requested by the first read request, the number of unread file segments that are in the cache and pertain to the file is less than a preset number; and file segments corresponding to the to-be-read data requested by the first read request are unread file segments except the predetermined number of unread file segments during a previous pre-reading.

Optionally, the processor is further configured to receive a second read request sent by the client, where to-be-read data requested by the second read request is a part of the file; and read, from the cache, data that is of the to-be-read data requested by the second read request and that is located in the cache; and read, from the first storage medium, data that is of the to-be-read data requested by the second read request and that is not located in the cache.

According to a fourth aspect, an embodiment of the present invention provides a file reading system. The system includes a user equipment and a file storage device, where the user equipment is configured to receive an original file restoration request from a user, and generate a plurality of read requests according to the original file restoration request; and send the read requests to the storage device; and the storage device is the foregoing storage device.

Using the technical solutions provided in the embodiments of the present invention, upon receiving the first read request sent by the client, the storage device pre-reads, from the first storage medium, the data in at least one of the containers, and stores the pre-read data into the cache, where the pre-read container includes at least one unread file segment of the file. In this way, upon receiving a read request for the file subsequently sent by the client, the storage device may directly read the to-be-read data from the pre-read data in the cache, thereby reducing a time overhead in reading data. Because it is unnecessary to pre-read data of the entire file and store the data into the cache, storage space required by the cache is not large. The cache in this embodiment of the present invention may be a common memory. In some cases, the cache may be implemented by directly using an original memory in a storage system. Therefore, in the embodiments of the present invention, no additional hardware expenditure is required, thereby reducing hardware costs.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

An embodiment of the present invention provides a file reading method, which is applicable to reading of a file stored on a storage device, and particularly applicable to reading of a de-duplication file stored on the storage device. The storage device generally includes a first storage medium (the first storage medium includes, but is not limited to, a disk, a flash memory, and a compact disc (CD)), and a cache, where an access speed of the cache is greater than that of the first storage medium. The first storage medium has a plurality of containers, and each container is divided into a plurality of chunks. One file may be divided into a plurality of file segments, data volume of each file segment may be different from that of another, and one chunk stores one file segment. The number of file segments of one file included in one container is also referred to as a reference count of the container. For example, assuming that a file A is formed by 100 file segments, the 100 file segments are distributed in three containers in the first storage medium, the number of file segments of the file A in the three containers are 20, 30, and 50 respectively, and reference counts of the three containers are 20, 30, and 50 respectively. It should be noted that these three containers may further include file segments of other files in addition to the file segments of the file A. In this embodiment of the present invention, the access speed may be the speed of reading data from a storage medium, and the storage medium may be the cache or the first storage medium.

In this embodiment of the present invention, a file system used by the storage device includes, but is not limited to, a Linux® file system or a Windows® file system. For a better understanding of the technical solutions provided in the embodiments of the present invention, the embodiments of the present invention give a detailed description on the technical solutions using a de-duplication file in the Linux file system as an example.

First, a storage structure of the de-duplication file in the Linux file system is described. The de-duplication file includes two parts, an inode and a container. The inode is stored in an inode table maintained in the file system. Once a de-duplication file is created, the file system allocates one inode to the de-duplication file. The inode is used to record meta-information (for example, a size and creation time of a file) of the de-duplication file. Each container is a storage space with a designated size (for example, 9 megabytes (MB), and each container is divided into a plurality of chunks. A size of one chunk may be 4 kilobytes (KB) to 12 KB.

Figure 1:
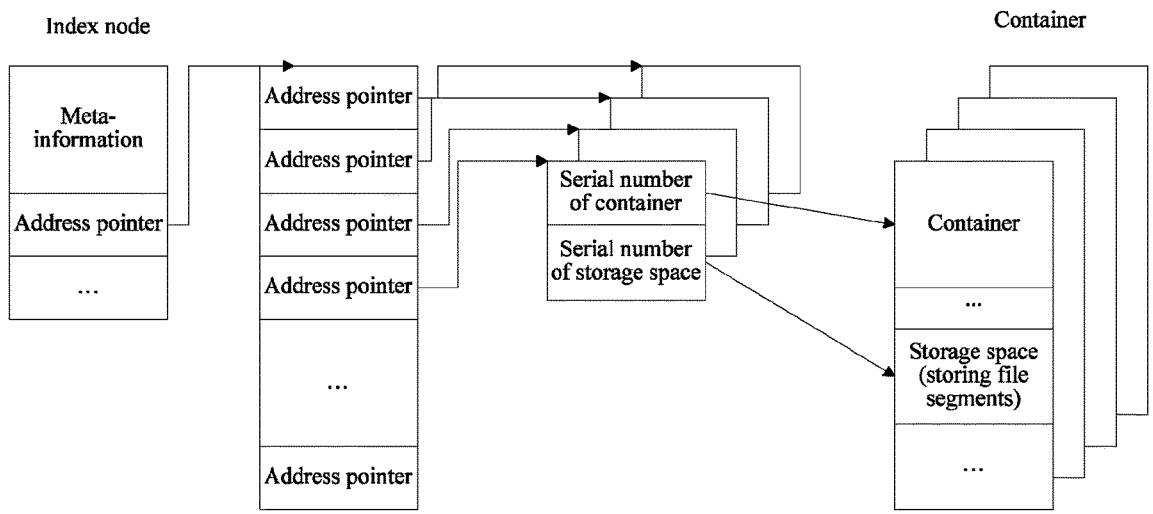
FIG. 1 is a schematic diagram of a storage structure of a data de-duplication file according to an embodiment of the present invention.

Referring to FIG. 1, the inode is associated with the container. The meta-information includes several address pointers eptrs for pointing to file segments of the de-duplication file. The eptrs generally includes two types, a direct type and an indirect type. A direct-type eptr directly points to a chunk, and an indirect-type eptr points to another eptr. One direct-type eptr determines two parameters. One is a serial number of a chunk, and the other is a serial number of a container. As de-duplication files increase, file segments grow massively, and an increasing number of de-duplication files may reference file segments of a previous de-duplication file. In this case, some eptrs in a currently stored de-duplication file may point to eptrs of the previously stored de-duplication file.

It should be noted that, because one chunk stores one file segment, a file segment to which an eptr points refers to a file segment stored in a chunk to which the eptr points in this embodiment of the present invention.

Embodiment 1

Figure 2:
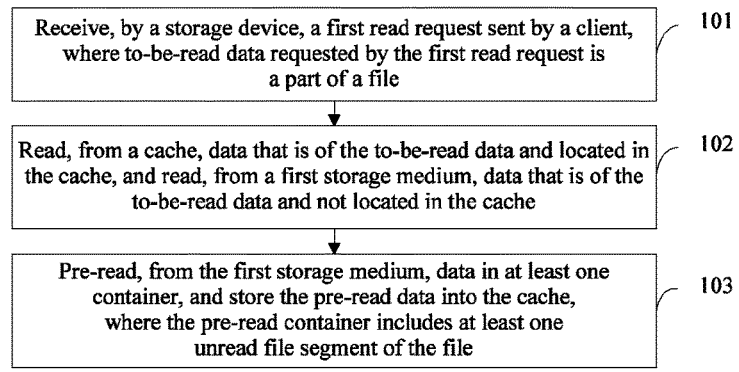
FIG. 2 is a flowchart of a file reading method according to an embodiment of the present invention.

This embodiment of the present invention provides a file reading method applicable to reading of a file stored on a storage device. Referring to FIG. 2, a procedure of the method includes the following steps:

Step 101: The storage device receives a first read request sent by a client, where data requested by the first read request is called to-be-read data, and the to-be-read data is a part of the file. The reading of the file can be completed at a plurality of times or at one time. When the reading of the file is completed at a plurality of times, a read request is sent at a time for request reading a part of the file, where the first read request is one of such requests.

The storage device includes a first storage medium and a cache. An access speed of the cache is greater than that of the first storage medium. The first storage medium has a plurality of containers. The file includes a plurality of file segments, and the file segments constituting the file are all stored in the first storage medium, or a part of the file segments are stored in the first storage medium and the remaining part of the file segments are stored in the cache; or are all stored in the cache.

The first storage medium includes, but is not limited to, a magnetic disk, a flash memory, or a CD. The cache includes, but is not limited to, a random access memory (RAM) or a read only memory (ROM).

The first read request may include a name of the file, a start position of the to-be-read data, and data volume of the to-be-read data. The data volume of the to-be-read data is a part of a total data volume of the file, where the term "a part" may not indicate the entire file or may indicate the entire file.

The to-be-read data requested by the read request is a designated quantity of data starting from data corresponding to the start position of the to-be-read data in the first read request, where the designated quantity of data is equal to the data volume of the to-be-read data requested by the read request. The designated quantity may be, for example, a data volume of 64 Kilobytes (KB) or 128 KByte.

Step 102: Read, from the cache, data that is of the to-be-read data and located in the cache, and read, from the first storage medium, data that is of the to-be-read data and not located in the cache.

In this embodiment, the data in the cache may be read before the data in the first storage medium. If all the to-be-read data is in the cache, a volume of the data read from the first storage medium is 0; and if the to-be-read data does not exist in the cache, a volume of the data read from the cache is 0.

Step 103: Pre-read, from the first storage medium, data in at least one of the containers, and store the pre-read data into the cache, where the pre-read container includes at least one unread file segment of the file. The pre-read data may be stored in the cache in a form of the container.

Unread file segments are file segments of the file except file segments corresponding to the to-be-read data requested by the current read request, and file segments that have been read before the current read request.

Using the method provided in this embodiment of the present invention, upon receiving the first read request sent by the client, the storage device pre-reads, from the first storage medium, the data in at least one of the containers, and stores the pre-read data into the cache, where the pre-read container includes at least one unread file segment of the file. In this way, upon receiving a read request for the file subsequently sent by the client, the storage device may directly read the to-be-read data from the pre-read data in the cache, thereby reducing a time overhead in reading data. Because it is unnecessary to pre-read data of the entire file and store the data into the cache, storage space required by the cache is not large. The cache in this embodiment of the present invention may be a common memory. In some cases, the cache may be implemented by directly using an original memory in a storage system. Therefore, in this embodiment of the present invention, no additional hardware expenditure is required, thereby reducing hardware costs.

Embodiment 2

This embodiment describes in detail a file reading method according to the present invention using a de-duplication file as an example. First, the following simply describes an applicable scenario of this embodiment of the present invention, which is not limited herein. Instead, this embodiment of the present invention is applicable to any scenarios where the de-duplication file needs to be read. The de-duplication file is generally used for backup, and is a backup file of a certain original file. Content of the de-duplication file is at least substantially the same as content of the corresponding original file. During backup of the original file, a correspondence between the de-duplication file and the backed up original file is established.

It is assumed that the original file is damaged, and a user intends to read the backup de-duplication file to restore the original file. In this case, the user enables a user interface of a client (for example, a certain backup application) using such an interactive manner as mouse click or screen touch, and submits a request for restoration of the original file to the client under guidance of the user interface, where the restoration request includes a name of the original file. The client acquires data of the de-duplication file corresponding to the original file from the storage device (for example, a server) according to the request for restoration of the original file. The client may be installed on a user device such as a mobile computer. The client may also be installed on the storage device such as the server.

Figure 3:
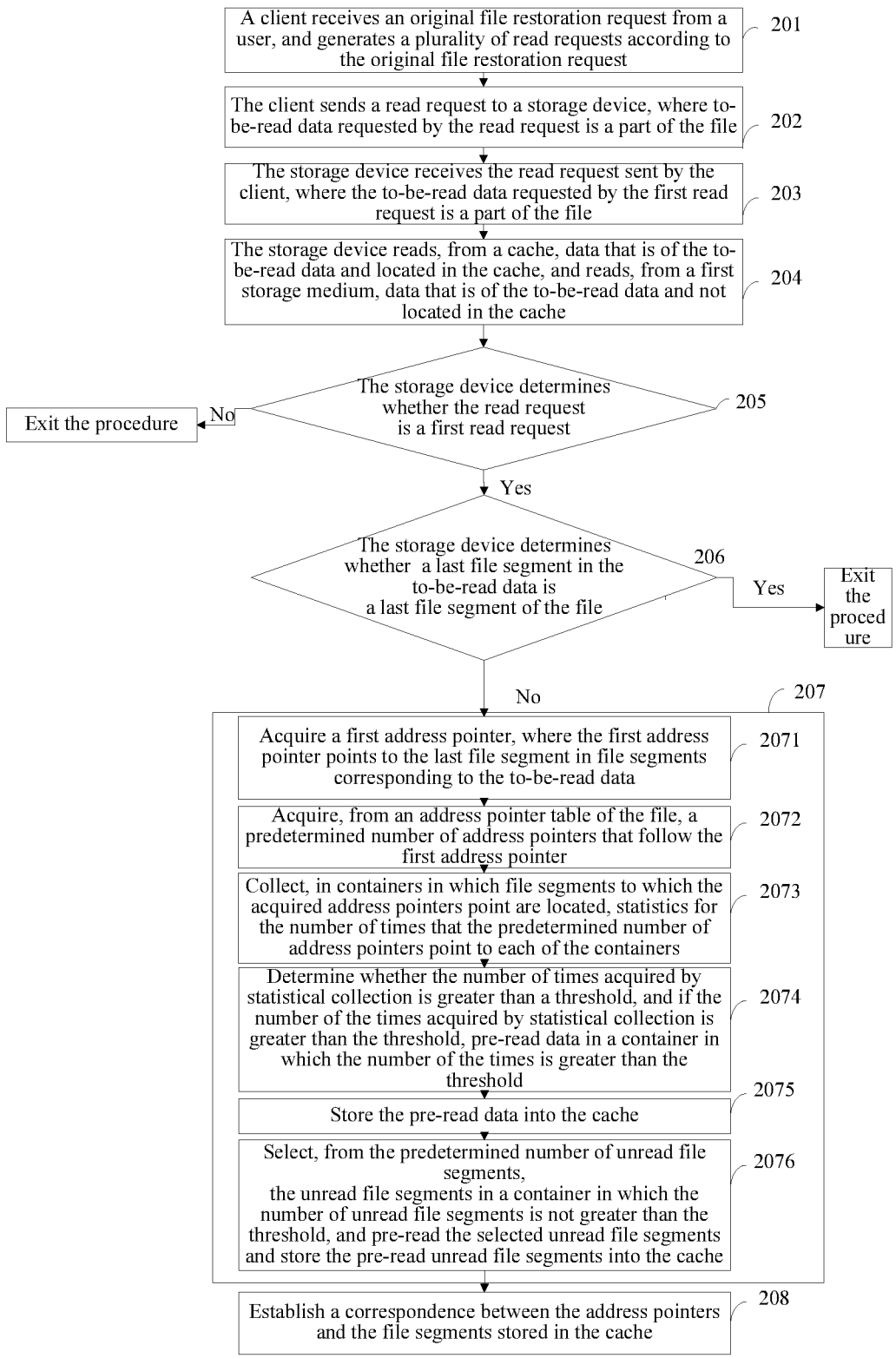
FIG. 3 is a flowchart of another file reading method according to an embodiment of the present invention.

In this scenario, an embodiment of the present invention provides a file reading method. Referring to FIG. 3, a procedure of the method includes the following steps:

Step 201: A client receives an original file restoration request from a user, and generates a plurality of read requests according to the original file restoration request.

A read request includes a name of a de-duplication file, a start position of to-be-read data, and data volume of the to-be-read data. Data volume of to-be-read data requested by a read request is a part of a total data volume of the de-duplication file. In specific implementation, the start position of the to-be-read data may be indicated by an offset of the file. These read requests are all directed to the same de-duplication file. That is, names of the de-duplication files in these read requests are the same.

Upon receiving the restoration request, the client searches for the de-duplication file corresponding to the original file in the correspondence (established during the backup process) between the original file and the de-duplication file, and acquires a size of the found de-duplication file. Then, the plurality of read requests is generated. The data volume of the to-be-read data requested by each of the plurality of read requests may be configured by the user according to actual conditions, and normally does not exceed a maximum data volume supported by a file reading protocol.

As described above, one de-duplication file may be divided into a plurality of file segments. Because data included in the de-duplication file is subject to a specific sequence, the plurality of file segments obtained by dividing the de-duplication file are contiguous.

The to-be-read data requested by one read request may include one or more file segments. The to-be-read data requested by one read request may be all data included in at least one file segment, or the to-be-read data requested by one read request may be all data included in at least one file segment and a part of data included in at least one file segment. If the number of file segments corresponding to the to-be-read data requested by one read request is greater than 2, the more than two file segments are contiguous. For example, it is assumed that one de-duplication file is divided into F file segments, and the file segments corresponding to the to-be-read data requested by one read request are file segment i to file segment i+j. The to-be-read data requested by the read request may be all data of file segment i to file segment i+j, or a latter part of data of file segment i, and all data of file segment i+1 to file segment i+j, or a former part of data of file segment i+j, and all data of file segment i+1 to file segment i+j−1, or a latter part of the data of file segment i, and a former part of the data of file segment i+j, and all data of file segment i+1 to file segment i+j−1, where i and j are natural numbers, and j>i. The term "contiguous" in this embodiment of the present invention means a relationship of the file segments in a file. That is, one file may be divided into a plurality of file segments, where these file segments are subject to a sequence. The file may be restored by splicing these file segments according to the contiguous sequence.

Step 202: The client sends a read request to a storage device, where to-be-read data requested by the read request is a part of the file.

A reading process of one de-duplication file may be divided into a plurality of reading processes by generating the plurality of read requests, and during each reading process, a part of data is read from the de-duplication file, and data requested by all the read requests jointly constitutes data of the original file. The client submits a read request to the storage device using the file reading protocol during each reading process.

In this embodiment of the present invention, assuming that the client divides a reading process of a de-duplication file into Z reading processes, where during the Z reading processes, read requests submitted to the storage device are sequentially a first read request, a second read request, . . . , a $Z-1^{th}$ request, and a $Z^{th}$ read request.

Step 203: The storage device receives the read request sent by the client, where the to-be-read data requested by the read request is a part of the file.

Step 204: The storage device reads, from a cache, data that is of the to-be-read data and located in the cache, and reads, from a first storage medium, data that is of the to-be-read data and not located in the cache.

That the storage device reads, from a cache, data that is of the to-be-read data and located in the cache, and reads, from a first storage medium, data that is of the to-be-read data and not located in the cache may include, if all to-be-read data requested by the read request exists in the cache, the storage device reads all the to-be-read data from the cache; if a part of the to-be-read data is located in the cache, and the other part of the to-be-read data does not exist in the cache, the storage device reads the part of the to-be-read data from the cache, and reads the other part of the to-be-read data from the first storage medium; and if there is not any to-be-read data in the cache, the storage device reads all the to-be-read data from the first storage medium. For example, if the read request received in step 203 is the first read request of the de-duplication file, and no file segment corresponding to an eptr exists in the cache; in this case, the storage device reads, from the first storage medium, file segments to which eptrs corresponding to all the to-be-read data point, and returns the to-be-read data to the client. If the read request received in step 203 is not the first read request of the de-duplication file, and a part of or all the to-be-read data requested by the current read request may exist in the cache.

That the storage device reads (all or a part of) the to-be-read data from the cache includes, first, the storage device acquires the eptrs corresponding to all the to-be-read data. The storage device queries an inode of the de-duplication file in an inode table according to the name of the de-duplication file. The storage device acquires in sequence a predetermined number of eptrs starting from an eptr corresponding to the start position of the to-be-read data according to a correspondence between positions of the to-be-read data and eptrs in the eptr table indicated by the inode of the de-duplication file. A sequence of the eptrs in the eptr table is the same as a sequence of the file segments in the file, the number of the eptrs is the same as the number of the file segments, and the eptrs are in a one-to-one correspondence with the file segments. Second, the storage device queries, in the pre-established correspondence between the eptrs and the file segments stored in the cache, whether the file segments corresponding to the acquired eptrs exist. If the file segments corresponding to all eptrs exist in the cache, the storage device reads all the to-be-read data from the cache; and if the file segments corresponding to a part of the eptrs exist in the cache, the storage device reads a part of the to-be-read data from the cache. It should be noted that, for details on a process of establishing the correspondence between the eptrs and the file segments stored in the cache, refer to step 208.

Step 205: When the read request is the first read request, perform step 206; and when the read request is a second read request, exit the procedure.

The first read request is a read request that satisfies a pre-read trigger condition, and the second read request is a read request directed to the de-duplication file in addition to the first read request. That is, the first read request may trigger a pre-read process (for details, refer to step 207), but the second read request may not trigger a pre-read process.

Content of the pre-read trigger condition is described in the following part of this embodiment.

Step 206: The storage device determines whether a last file segment in the to-be-read data that has been read is a last file segment of the file; if the last file segment of the to-be-read data that has been read is the last file segment of the file, exit the procedure; and if the last file segment of the to-be-read data that has been read is not the last file segment of the file, perform step 207.

The storage device determines whether a last file segment in the to-be-read data that has been read is a last file segment of the de-duplication file includes first, acquiring a first eptr, where the first eptr points to the last file segment in the to-be-read data that has been read; second, acquiring a last eptr in the eptr table indicated by the inode of the de-duplication file; and finally, determining whether the first eptr with the last eptr in the eptr table. If the two eptrs are the same, the storage device determines that the last file segment in the to-be-read data that has been read is the last file segment of the de-duplication file. That is, the de-duplication file has been read, and the procedure is exited. If the two eptrs are different, step 207 is performed.

Step 207: Pre-read, from the first storage medium, data in at least one of the containers, and store the pre-read data into the cache, where the pre-read container includes at least one unread file segment of the file.

Step 207 may include the storage device pre-reads, from the first storage medium and among containers in which a predetermined number of unread file segments are located, data in a container in which the number of the predetermined number of file segments is greater than a threshold, and stores the pre-read data into the cache. If the threshold is 50, in this step, the container in which the predetermined number of file segments is greater than 50 is pre-read into the cache.

The predetermined number of unread file segments are contiguous in the file, and the predetermined number of unread file segments are adjacent to file segments corresponding to the to-be-read data in the file. The predetermined number of unread file segments may be remaining unread file segments, or a part of the remaining unread file segments. When the predetermined number of unread file segments are a part of all the unread file segments, the unread file segments may be indicated by quantity or data volume, for example, 1000 unread file segments, or 10G Bytes unread file segments.

Step 207 may include the following steps:

Step 2071: Acquire a first eptr, where the first eptr points to the last file segment in the file segments corresponding to the to-be-read data.

Figure 4:
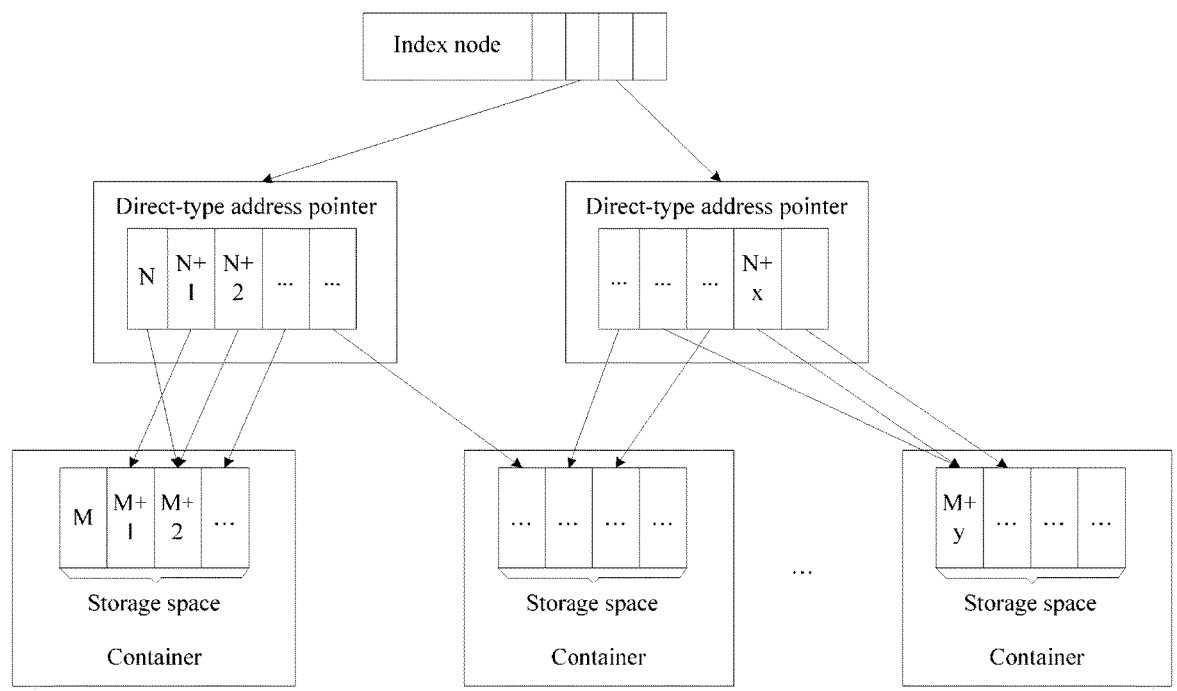
FIG. 4 is a schematic diagram of association between an address pointer and a container according to an embodiment of the present invention.

Referring to FIG. 4, it is assumed that the acquired first eptr is N.

Step 2072: Acquire, from an eptr table of the file, a predetermined number of eptrs that follow the first eptr.

An eptr depicts a chunk in a container of the first storage medium, in which a file segment of the de-duplication file is located. That is, if an eptr is known, a storage address of a file segment is determined.

Step 2072 includes, in the eptr table of the de-duplication file, taking the first eptr as a start pointer, determining whether the number of all eptrs that follow the first eptr is greater than a predetermined number; if the number of all the eptrs that follow the first eptr is greater than the predetermined number, acquiring all the eptrs that follow the first eptr; and if the number of all the eptrs that follow the first eptr is not greater than the predetermined number, acquiring the predetermined number of eptrs.

The eptr table is associated with the inode. The eptr table is allocated by a file system to the de-duplication file. The eptr table is stored in a storage space specified by the file system. Because each eptr in the eptr table points to one file segment and the file segments are contiguous, the eptrs in the eptr table are contiguous, and the sequence of eptrs is consistent with the sequence of the file segments in the de-duplication file.

The predetermined number may be the total number of all unread file segments of the de-duplication file, or may be a part of the total number of unread file segments of the de-duplication file, and the predetermined number is a preset fixed value, for example, 50M. Data volume of file segments to which the predetermined number of eptrs point may be not less than a volume of data previously read from the de-duplication file, which ensures that a volume of data stored in the cache satisfies a volume of data requested by a next read request for the de-duplication file. A size of one file segment is generally 4 KB to 12 KB, and an average size of one file segment is 8 KB, that is, an average volume of data to which one eptr points is 8 KB. After an eptr that points to the last file segment in the read data is acquired, the eptr is used as the first eptr, the first eptr is used as a start pointer, and the predetermined number of eptrs that follow the first eptr are acquired. Referring to FIG. 4, it is assumed that all the acquired eptrs are N, N+1, N+2, . . . , N+x.

Step 2073: Collect, in containers in which file segments to which the acquired eptrs point are located, statistics for the number of times that the predetermined number of eptrs point to each of the containers, that is, the number of times that the predetermined number of file segments are contained in the containers.

Each container may be 9 megabytes (MB). To implement a length-variable chunk, the size of each file segment is between 4 KB and 12 KB. That is, with respect to the de-duplication file, a size of a file segment to which each direct-type eptr points is averagely 8K. When the number of eptrs pointing to file segments that are in the same container is about 9M/8K, basically all file segments in the container are referenced by the de-duplication file. However, as backup file segments gradually increase, the number of times that some containers are referenced by the de-duplication file is reduced, that is, only a small number of eptrs point to these containers. For example, it is assumed that there is only one eptr pointing to a file segment located in a container with a sequence number M'+1, that is, the number of times that eptrs point to the container M'+1 is 1.

Step 2074: Determine whether the number of the times acquired by statistics collection is greater than the threshold, and if the number of the times acquired by statistics collection is greater than the threshold, pre-read data in a container in which the number of the times is greater than the threshold.

The predetermined threshold is a preset fixed value, for example, 5. When the number of times that the predetermined number of eptrs point to a container is greater than 5, data in the container is pre-read.

Pre-reading data in a container in which the number of the times is greater than the threshold may include pre-reading, in descending order of the number of unread file segments in the predetermined number of file segments that are stored, data in the container in which the number of the times is greater than the threshold.

When the number of times that eptrs point to a container is less than a predetermined threshold, the unread file segments in the container may be separately read and then stored in the cache, which, compared with reading all file segments in the entire container, saves more storage space in the cache.

Step 2075: Store the pre-read data into the cache.

Step 2076: Select, from the predetermined number of unread file segments, unread file segments in a container in which the number of unread file segments is not greater than the threshold, and pre-read the selected unread file segments and store the pre-read unread file segments into the cache.

Step 208: Establish a correspondence between the eptrs and the file segments stored in the cache.

In addition, after the pre-read data is stored in the cache, a correspondence between the predetermined number of eptrs acquired in step 2072 and the file segments in the cache is established. The correspondence may be stored in a form of a list. The correspondence enables the storage device to acquire the data in the cache using the eptrs.

Steps 203 to 208 may be repeatedly performed until the entire de-duplication file is read and returned to the client. The de-duplication file is the file requested by the client and is the same as the original file. In this embodiment, the foregoing steps need to be repeated for Z−1 times so that the entire de-duplication file is returned to the client.

In this embodiment, the pre-read trigger condition may include one or more of the following conditions: first, time when the storage device receives the read request falls within a predetermined time period; second, the to-be-read data requested by the read request does not exist in the cache, or a part of the to-be-read data requested by the read request does not exist in the cache; third, after the storage device reads the to-be-read data requested by the read request, the number of unread file segments pertaining to the file in the cache is less than a preset number; and fourth, file segments corresponding to the to-be-read data requested by the read request are unread file segments except the predetermined number of unread file segments during a previous pre-reading.

Assuming that a currently employed pre-read trigger condition is the second trigger condition as described above, in this step, when the read request is the first read request, the to-be-read data requested by the read request does not exist in the cache. In this case, the read request satisfies the pre-read trigger condition, and the read request is the first read request.

Assuming that the currently employed pre-read trigger condition includes the second and third trigger conditions as described above, with respect to the third trigger condition, after a certain pre-reading process of a de-duplication file is completed, as subsequent read requests for the de-duplication file increase, more and more data in the cache is read. Therefore, a data volume threshold may be set for the unread file segments stored in the cache. When the data volume of the unread file segments is less than threshold, a next run of pre-reading operations are performed.

The acquiring the data volume of the unread file segments in the cache may include, first, reading the to-be-read data from the cache, and marking the read file segments; and then, collecting statistics for the data volume of the unmarked file segments in the cache, that is, the data volume of the unread file segments in the cache.

With respect to the fourth trigger condition, refer to the pre-reading process described in step 207 in Embodiment 2. If the file segments corresponding to the to-be-read data requested by the current read request include the predetermined number of unread file segments that are determined during a previous pre-reading process of the current read request, the to-be-read data requested by the current read request may have been read. Therefore, it is unnecessary to trigger the pre-reading process again. On the contrary, if the file segments corresponding to the to-be-read data requested by the current read request are unread file segments except the predetermined number of unread file segments that are determined during a previous pre-reading process of the current read request, the to-be-read data requested by the current read request has not been read. Therefore, the pre-reading process may be triggered, so that the pre-read data is read from the cache in response to a read request subsequent to the current read request, thereby improving reading performance.

The method provided in this embodiment of the present invention may achieve the following beneficial effects. Upon receiving the first read request sent by the client, the storage device pre-reads, from the first storage medium, the data in at least one of the containers, and stores the pre-read data into the cache, where the pre-read container includes at least one unread file segment of the file. In this way, upon receiving a read request for the file subsequently sent by the client, the storage device may directly read the to-be-read data from the pre-read data in the cache, thereby reducing a time overhead in reading data. Because it is unnecessary to pre-read data of the entire file and store the data into the cache, storage space required by the cache is not large. The cache in this embodiment of the present invention may be a common memory. In some cases, the cache may be implemented by directly using an original memory in a storage system. Therefore, in this embodiment of the present invention, no additional hardware expenditure is required, thereby reducing hardware costs.

In addition, in this embodiment of the present invention, data pre-read from the at least one of the containers includes, among the containers in which the predetermined number of unread file segments are located, data in a container in which the number of the predetermined number of file segments is greater than the threshold. For example, if the predetermined number is 280, the threshold is 50, and the 280 file segments are separately arranged in eight containers, the numbers of file segments, among the 280 file segments, that are contained in the eight containers are 20, 25, 25, 30, 30, 43, 52, and 55 respectively. The data pre-read from the at least one of the containers includes all data in containers in which the numbers of file segments, among the 280 file segments are 52 and 55 respectively. Before the pre-reading, statistics collection is separately performed on the number of file segments among the predetermined number of unread file segments that are stored in the containers. When the number is greater than a predetermined threshold, the container is read, which therefore prevents reading of excessive data that is not used, and further reduces the number of times that data is read from the first storage medium. In this way, file reading performance is improved.

Embodiment 3

Figure 5:
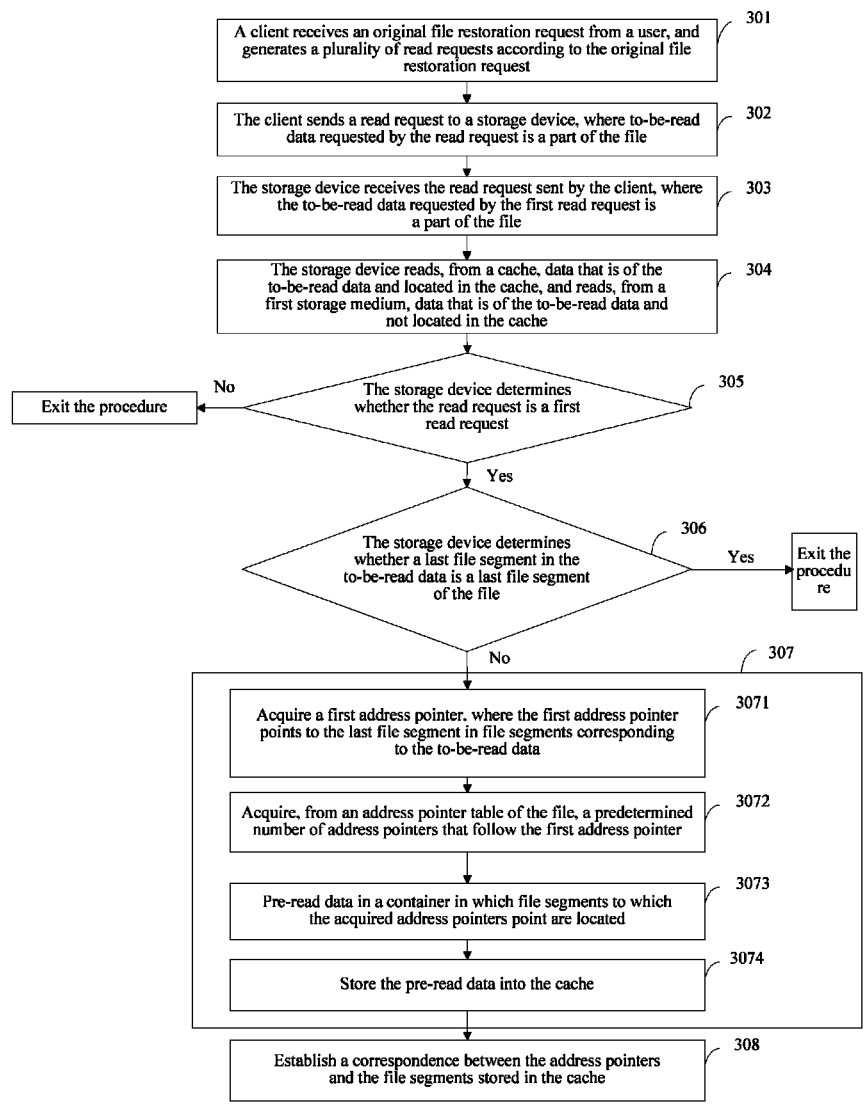
FIG. 5 is a flowchart of still another file reading method according to an embodiment of the present invention.

This embodiment of the present invention provides a file reading method. This embodiment differs from Embodiment 2 of the present invention in that (1) manners of pre-reading, from a first storage medium, data in at least one of the containers are different; (2) pre-read trigger conditions are different. Referring to FIG. 5, a procedure of the method includes the following steps:

Step 301: A client receives an original file restoration request from a user, and generates a plurality of read requests according to the original file restoration request.

Step 301 is the same as step 201 in Embodiment 2, and is not described herein any further.

Step 302: The client sends a read request to a storage device, where to-be-read data requested by the read request is a part of the file.

Step 302 is the same as step 202 in Embodiment 2, and is not described herein any further.

Step 303: The storage device receives the read request sent by the client, where the to-be-read data requested by the read request is a part of the file.

Step 303 is the same as step 203 in Embodiment 2, and is not described herein any further.

Step 304: The storage device reads, from a cache, data that is of the to-be-read data and located in the cache, and read, from a first storage medium, data that is of the to-be-read data and not located in the cache.

Step 304 is the same as step 204 in Embodiment 2, and is not described herein any further.

Step 305: When the read request is a first read request, perform step 306; and when the read request is a second read request, exit the procedure.

In this embodiment, a pre-read trigger condition may include one or more of the following conditions: first, time when the storage device receives the first read request falls within a predetermined time period; second, the to-be-read data requested by the read request does not exist in the cache, or a part of the to-be-read data requested by the read request does not exist in the cache; and third, after the storage device reads the to-be-read data requested by the read request, the number of unread file segments in the cache is less than a preset number.

These three trigger conditions are the same as the first three trigger conditions described in Embodiment 2, which are not described herein any further.

Step 306: The storage device determines whether a last file segment in the to-be-read data that has been read is a last file segment of the file; if the last file segment of the to-be-read data that has been read is the last file segment of the file, exit the procedure; and if the last file segment of the to-be-read data that has been read is not the last file segment of the file, perform step 307.

Step 306 is the same as step 206 in Embodiment 2, and is not described herein any further.

Step 307: Pre-read, from the first storage medium, data in at least one of the containers, and store the pre-read data into the cache, where the pre-read container includes at least one unread file segment of the file.

Step 307 may include the storage device pre-reads, from the first storage medium, data in a container in which a predetermined number of unread file segments are located, and stores the pre-read data into the cache. The predetermined number of unread file segments are contiguous in the file, and the predetermined number of unread file segments are adjacent to file segments corresponding to the to-be-read data in the file. The term "contiguous in the file" means that the file segments are subject to a sequence, and the file may be restored by splicing these file segments according to the sequence.

Step 307 may include the following steps:

Step 3071: Acquire a first eptr, where the first eptr points to the last file segment in the file segments corresponding to the to-be-read data.

Step 3071 is the same as step 2071 in Embodiment 2, and is not described herein any further.

Step 3072: Acquire, from an eptr table of the file, a predetermined number of eptrs that follow the first eptr.

Step 3072 is the same as step 2072 in Embodiment 2, and is not described herein any further.

Step 3703: Pre-read data in a container in which file segments to which the acquired eptrs point are located.

As described above, an eptr depicts a chunk in a container of the first storage medium to which file segments of a de-duplication file pertain. According to the acquired predetermined number of eptrs, serial numbers of containers in which the file segments to which the predetermined number of eptrs point are located may be acquired, and data in the containers may be read.

Step 3074: Store the pre-read data into the cache.

Step 3074 is the same as step 2075 in Embodiment 2, and is not described herein any further.

Step 308: Establish a correspondence between the eptrs and the file segments stored in the cache.

Step 308 is the same as step 208 in Embodiment 2, and is not described herein any further.

Steps 303 to 308 are repeatedly performed until the entire de-duplication file is read and returned to the client.

The method provided in this embodiment of the present invention may achieve the following beneficial effects. Upon receiving the first read request sent by the client, the storage device pre-reads, from the first storage medium, the data in at least one of the containers, and stores the pre-read data into the cache, where the pre-read container includes at least one unread file segment of the file. In this way, upon receiving a read request for the file subsequently sent by the client, the storage device may directly read the to-be-read data from the pre-read data in the cache, thereby reducing a time overhead in reading data. Because it is unnecessary to pre-read data of the entire file and store the data into the cache, storage space required by the cache is not large. The cache in this embodiment of the present invention may be a common memory. In some cases, the cache may be implemented by directly using an original memory in a storage system. Therefore, in this embodiment of the present invention, no additional hardware expenditure is required, thereby reducing hardware costs.

Embodiment 4

Figure 6:
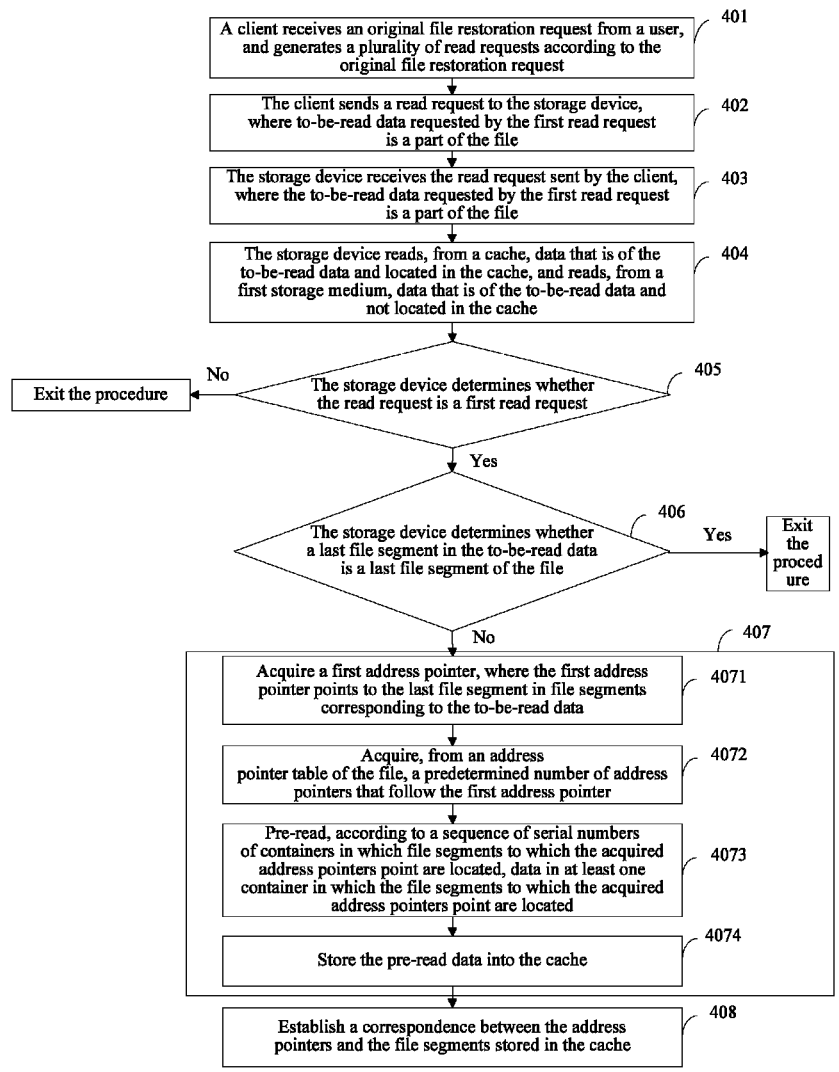
FIG. 6 is a flowchart of yet another file reading method according to an embodiment of the present invention.

This embodiment of the present invention provides a file reading method. This embodiment differs from Embodiment 2 or 3 of the present invention in that manners of pre-reading, from a first storage medium, data in at least one of the containers are different. Referring to FIG. 6, a procedure of the method includes the following steps:

Step 401: A client receives an original file restoration request from a user, and generates a plurality of read requests according to the original file restoration request. The data requested by each of the read requests is a part of data of the original file, and the data requested by the plurality of read requests jointly form the original file.

Step 401 is the same as step 301 in Embodiment 3, and is not described herein any further. The subsequent steps are described using a certain read request as an example.

Step 402: The client sends a read request to a storage device, where to-be-read data requested by the read request is a part of the file.

Step 402 is the same as step 302 in Embodiment 3, and is not described herein any further.

Step 403: The storage device receives the read request sent by the client, where the to-be-read data requested by the read request is a part of the file.

Step 403 is the same as step 303 in Embodiment 3, and is not described herein any further.

Step 404: The storage device reads, from a cache, data that is of the to-be-read data and located in the cache, and read, from a first storage medium, data that is of the to-be-read data and not located in the cache.

Step 404 is the same as step 304 in Embodiment 3, and is not described herein any further.

Step 405: When the read request is a first read request, perform step 406; and when the read request is a second read request, exit the procedure.

Step 405 is the same as step 305 in Embodiment 3, and is not described herein any further.

Step 406: The storage device determines whether a last file segment in the to-be-read data that has been read is a last file segment of the file; if the last file segment of the to-be-read data that has been read is the last file segment of the file, exit the process; and if the last file segment of the to-be-read data that has been read is not the last file segment of the file, perform step 407.

Step 406 is the same as step 306 in Embodiment 3, and is not described herein any further.

Step 407: Pre-read, from the first storage medium, data in at least one of the containers, and store the pre-read data into the cache, where the pre-read container includes at least one unread file segment of the file.

Step 407 may include the storage device pre-reads, from the first storage medium according to a sequence of serial numbers of containers in which a predetermined number of unread file segments are located, data in at least one of the containers in which the predetermined number of file segments are located, and stores the pre-read data into the cache.

The predetermined number of unread file segments are contiguous in the file, and the predetermined number of unread file segments are adjacent to file segments corresponding to the to-be-read data in the file. The term "contiguous in the file" means that the file segments are subject to a sequence, and the file may be restored by splicing these file segments according to the sequence.

Step 407 may include the following steps:

Step 4071: Acquire a first eptr, where the first eptr points to the last file segment in the file segments corresponding to the to-be-read data.

Step 4071 is the same as step 3071 in Embodiment 3, and is not described herein any further.

Step 4072: Acquire, from an eptr table of the file, a predetermined number of eptrs that follow the first eptr.

Step 4072 is the same as step 3072 in Embodiment 3, and is not described herein any further.

Step 4073: Pre-read, according to a sequence of serial numbers of containers in which file segments to which the acquired eptrs point are located, data in at least one of the containers in which the file segments to which the acquired eptrs point are located.

According to the acquired predetermined number of eptrs, the serial numbers of the containers in which the file segments to which the predetermined number of eptrs point are located may be acquired. All the containers are distributed in the first storage medium according to a sequence of the serial numbers. A serial number of a container may be an address segment from a start storage address to an end storage address. Referring to FIG. 4, it is assumed that a serial number of a container to which N points is M+2, a serial number of a container to which N+1 points is M+1, a serial number of a container to which N+2 points is M+2, and a serial number of a container to which N+x points is M+y. Table 1 lists serial numbers of all the containers.

TABLE 1

| Serial Number | Eptr | Serial Number of Container |
|---|---|---|
| 1 | N + 1 | M + 1 |
| 2 | N, N + 2 | M + 2 |
| ... | ... | ... |
| 3 | N + x | M + y |

All the data in the at least one of the containers in the first storage medium is read according to the sequence of the serial numbers of the containers.

Step 4074: Store the pre-read data into the cache.

Step 4074 is the same as step 3074 in Embodiment 3, and is not described herein any further.

Step 408: Establish a correspondence between the eptrs and the file segments stored in the cache.

Step 408 is the same as step 308 in Embodiment 3, and is not described herein any further.

Steps 403 to 408 are repeatedly performed until the entire de-duplication file is read and returned to the client.

The method provided in this embodiment of the present invention may achieve the following beneficial effects. Upon receiving the first read request sent by the client, the storage device pre-reads, from the first storage medium, the data in at least one of the containers, and stores the pre-read data into the cache, where the pre-read container includes at least one unread file segment of the file. In this way, upon receiving a read request for the file subsequently sent by the client, the storage device may directly read the to-be-read data from the pre-read data in the cache, thereby reducing a time overhead in reading data. Because it is unnecessary to pre-read data of the entire file and store the data into the cache, storage space required by the cache is not large. The cache in this embodiment of the present invention may be a common memory. In some cases, the cache may be implemented by directly using an original memory in a storage system. Therefore, in this embodiment of the present invention, no additional hardware expenditure is required, thereby reducing hardware costs.

In addition, in this embodiment, all the data in the at least one of the containers in the first storage medium is read according to the sequence of the serial numbers of the containers. Based on a file storage rule, during de-duplication of the original file, generally, file segments not stored in a de-duplication system are sequentially stored in the storage system according to the sequence of the serial numbers of the containers. Therefore, if the containers are also pre-read sequentially according to the sequence of the serial numbers of the containers, data pre-read from the containers may be to-be-read data requested by one or a plurality of next read requests. Therefore, according to this embodiment, an execution speed of a next read request may be improved, the number of times that data is read from the first storage medium is reduced, and file reading performance is improved. In addition, sequencing the containers according to the serial numbers and then performing pre-reading is simple in operation and easy to implement.

The sequence of the serial numbers of the containers may be in ascending order, and these serial numbers may be discontinuous. For example, during the pre-reading, if it is found by querying that the serial numbers of the containers in which the unread file segments are located are 10, 13, 15, 20, 21, and 40 respectively, containers to be pre-read this time may be selected from the six containers. Assuming that three containers are to be pre-read this time, the serial numbers of the containers to be pre-read are 10, 13, and 15 respectively.

Embodiment 5

Figure 7:
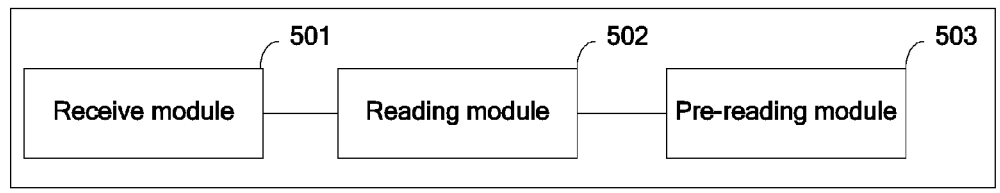
FIG. 7 to FIG. 10 are schematic structural diagrams of a file storage device according to an embodiment of the present invention.

This embodiment of the present invention provides a file storage device, which is applicable to the file reading method provided in Embodiment 1. The storage device is configured to store a file, and the storage device includes a first storage medium and a cache. An access speed of the cache is greater than that of the first storage medium. The first storage medium has a plurality of containers. The file includes a plurality of file segments. Referring to FIG. 7, the storage device includes following modules a receive module 501, configured to receive a first read request sent by a client, where to-be-read data requested by the first read request is a part of the file.

The first read request may include a name of the file, a start position of the to-be-read data, and data volume of the to-be-read data. The data volume of the to-be-read data is a part of the entire data volume of the file.

The to-be-read data requested by the read request is a designated quantity of data starting from data corresponding to the start position of the to-be-read data in the first read request, where the designated quantity of data is equal to the data volume of the to-be-read data requested by the read request; a reading module 502, configured to read, from the cache, data that is of the to-be-read data and located in the cache, and read, from the first storage medium, data that is of the to-be-read data and not located in the cache; and a pre-reading module 503, configured to pre-read, from the first storage medium, data in at least one of the containers, and store the pre-read data into the cache, where the pre-read container includes at least one unread file segment of the file.

The first storage medium includes, but is not limited to, a magnetic disk, a flash memory, or a CD. The cache includes, but is not limited to, a memory.

The storage device provided in this embodiment of the present invention may achieve the following beneficial effects. Upon receiving the first read request sent by the client, the storage device pre-reads, from the first storage medium, the data in at least one of the containers, and stores the pre-read data into the cache, where the pre-read container includes at least one unread file segment of the file. In this way, upon receiving a read request for the file subsequently sent by the client, the storage device may directly read the to-be-read data from the pre-read data in the cache, thereby reducing a time overhead in reading data. Because it is unnecessary to pre-read data of the entire file and store the data into the cache, storage space required by the cache is not large. The cache in this embodiment of the present invention may be a common memory. In some cases, the cache may be implemented by directly using an original memory in a storage system. Therefore, in this embodiment of the present invention, no additional hardware expenditure is required, thereby reducing hardware costs.

Embodiment 6

Figure 8:
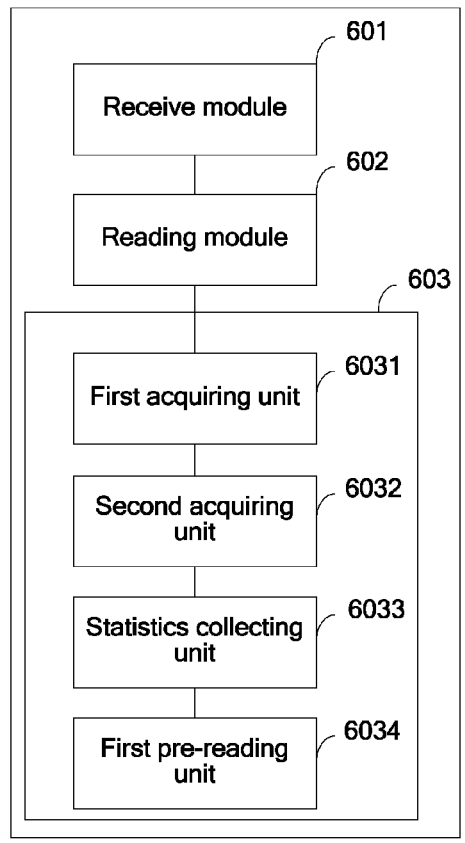

This embodiment of the present invention provides a file storage device, which is applicable to the file reading method provided in Embodiment 2. The storage device is configured to store a file, and the storage device includes a first storage medium and a cache. An access speed of the cache is greater than that of the first storage medium. The first storage medium has a plurality of containers. The file includes a plurality of file segments. Referring to FIG. 8, the storage device includes a receive module 601, configured to receive a first read request sent by a client, where to-be-read data requested by the first read request is a part of the file.

The first read request may include a name of the file, a start position of the to-be-read data, and data volume of the to-be-read data. The data volume of the to-be-read data is a part of the entire data volume of the file.

The to-be-read data requested by the read request is a designated quantity of data starting from data corresponding to the start position of the to-be-read data in the first read request, where the designated quantity of data is equal to the data volume of the to-be-read data requested by the read request.

The storage device further includes a reading module 602, configured to read, from the cache, data that is of the to-be-read data and located in the cache, and read, from the first storage medium, data that is of the to-be-read data and not located in the cache; and a pre-reading module 603, configured to pre-read, from the first storage medium, data in at least one of the containers, and store the pre-read data into the cache, where the pre-read container includes at least one unread file segment of the file.

The pre-reading module 603 is configured to pre-read, from the first storage medium and among containers in which a predetermined number of unread file segments are located, data in a container in which the number of the predetermined number of file segments is greater than a threshold, and store the pre-read data into the cache. The predetermined number of unread file segments are contiguous in the file, and the predetermined number of unread file segments are adjacent to file segments corresponding to the to-be-read data in the file.

The pre-reading module 603 is further configured to select, from the predetermined number of unread file segments, unread file segments in a container in which the number of unread file segments is not greater than the threshold, and pre-read the selected unread file segments and store the pre-read unread file segments into the cache.

The pre-reading module 603 includes a first acquiring unit 6031, configured to acquire a first eptr, where the first eptr points to a last file segment in the file segments corresponding to the to-be-read data; where the first acquiring unit 6031 is further configured to determine whether the last file segment in the to-be-read data that has been read is the last file segment of the file, and if the last file segment in the to-be-read data is not the last file segment of the file, acquire the first eptr; a second acquiring unit 6032, configured to acquire, from an eptr table of the file, a predetermined number of eptrs that follow the first eptr; where the second acquiring unit 6032 is configured to, in the eptr table of the file, take the first eptr as a start pointer, and determine whether the number of all eptrs that follow the first eptr is greater than a predetermined number; if the number of all the eptrs that follow the first address pointer is greater than the predetermined number, acquire all the all eptrs that follow the first eptr; and if the number of all the eptrs that follow the first eptr is not greater than the predetermined number, acquire the predetermined number of eptrs; a statistics collecting unit 6033, configured to collect, in containers in which file segments to which the acquired eptrs point are located, statistics for the number of times that the predetermined number of eptrs point to each of the containers; and a first pre-reading unit 6034, configured to determine whether the number of the times acquired by statistics collection is greater than the threshold, and if the number of the times acquired by statistics collection is greater than the threshold, pre-read data in a container in which the number of the times is greater than the threshold, and store the pre-read data into the cache.

The first read request received by the receive module 601 is a read request that satisfies a pre-read trigger condition, where the pre-read trigger condition includes one or more of the following conditions: time when the storage device receives the first read request falls within a predetermined time period; the to-be-read data requested by the first read request does not exist in the cache, or a part of the to-be-read data requested by the first read request does not exist in the cache; after the storage device reads the to-be-read data requested by the first read request, the number of unread file segments that are in the cache and pertain to the file is less than a preset number; and the file segments corresponding to the to-be-read data requested by the first read request are unread file segments except the predetermined number of unread file segments during a previous pre-reading.

The first read request received by the receive module 601 may include a name of the file, a start position of the to-be-read data, and data volume of the to-be-read data.

The reading module 602 is further configured to receive a second read request sent by the client, where to-be-read data requested by the second read request is a part of the file.

The pre-reading module 603 is configured to read, from the cache, data that is of the to-be-read data requested by the second read request and that is located in the cache; and read, from the first storage medium, data that is of the to-be-read data requested by the second read request and that is not located in the cache.

The first storage medium includes, but is not limited to, a magnetic disk, a flash memory, or a CD. The cache includes, but is not limited to, a memory.

The storage device provided in this embodiment of the present invention may achieve the following beneficial effects. Upon receiving the first read request sent by the client, the storage device pre-reads, from the first storage medium, the data in at least one of the containers, and stores the pre-read data into the cache, where the pre-read container includes at least one unread file segment of the file. In this way, upon receiving a read request for the file subsequently sent by the client, the storage device may directly read the to-be-read data from the pre-read data in the cache, thereby reducing a time overhead in reading data. Because it is unnecessary to pre-read data of the entire file and store the data into the cache, storage space required by the cache is not large. The cache in this embodiment of the present invention may be a common memory. In some cases, the cache may be implemented by directly using an original memory in the storage system. Therefore, in this embodiment of the present invention, no additional hardware expenditure is required, thereby reducing hardware costs.

In addition, in this embodiment of the present invention, data pre-read from the at least one of the containers includes, among the containers in which the predetermined number of unread file segments are located, data in a container in which the number of the predetermined number of unread file segments is greater than the threshold. For example, if the predetermined number is 280, the threshold is 50, and the 280 file segments are separately arranged in eight containers, the numbers of file segments, among the 280 file segments, that are contained in the eight containers are 20, 25, 25, 30, 30, 43, 52, and 55 respectively. The data pre-read from the at least one of the containers includes all data in containers in which the numbers of file segments, among the 280 file segments are 52 and 55 respectively. Before the pre-reading, statistics collection is separately performed on the number of unread file segments among the predetermined number of unread file segments that are stored in the containers. When the number is greater than a predetermined threshold, the container is read, which therefore prevents reading of excessive data that is not used, and further reduces the number of times that data is read from the first storage medium. In this way, file reading performance is improved.

Embodiment 7

Figure 9:
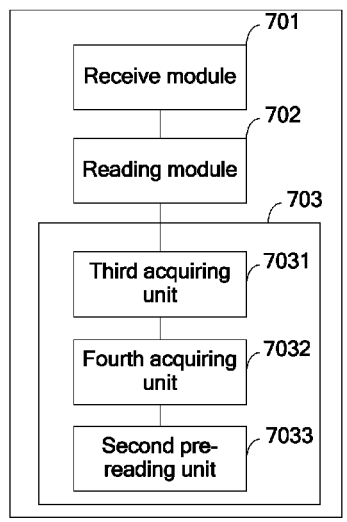

This embodiment of the present invention provides a file storage device, which is applicable to the file reading method provided in Embodiment 3. The storage device is configured to store a file, and the storage device includes a first storage medium and a cache. An access speed of the cache is greater than that of the first storage medium. The first storage medium has a plurality of containers. The file includes a plurality of file segments. Referring to FIG. 9, the storage device includes a receive module 701, a reading module 702, and a pre-reading module 703. Structures of the receive module 701 and the reading module 702 are the same as those of the receive module 601 and the reading module 602 in Embodiment 6, which are not described herein any further. However, a difference lies in that the pre-reading module 703 is configured to pre-read, from the first storage medium, data in a container in which a predetermined number of unread file segments are located, and store the pre-read data into the cache. The predetermined number of unread file segments are contiguous in the file, and the predetermined number of unread file segments are adjacent to file segments corresponding to to-be-read data in the file.

The pre-reading module 703 includes a third acquiring unit 7031, configured to acquire a first eptr, where the first eptr points to a last file segment in the file segments corresponding to the to-be-read data; a fourth acquiring unit 7032, configured to acquire, from an eptr table of the file, a predetermined number of eptrs that follow the first eptr; and a second pre-reading unit 7033, configured to pre-read data in a container in which file segments to which the acquired eptrs point are located, and store the pre-read data into the cache.

The first read request received by the receive module 701 is a read request that satisfies a pre-read trigger condition, where the pre-read trigger condition includes one or more of the following conditions: time when the storage device receives the first read request falls within a predetermined time period; the to-be-read data requested by the first read request does not exist in the cache, or a part of the to-be-read data requested by the first read request does not exist in the cache; and after the storage device reads the to-be-read data requested by the first read request, the number of unread file segments in the cache is less than a preset number.

The first read request received by the receive module 701 may include a name of the file, a start position of the to-be-read data, and data volume of the to-be-read data.

The first storage medium includes, but is not limited to, a magnetic disk, a flash memory, or a CD. The cache includes, but is not limited to, a memory.

The storage device provided in this embodiment of the present invention may achieve the following beneficial effects. Upon receiving the first read request sent by the client, the storage device pre-reads, from the first storage medium, the data in at least one of the containers, and stores the pre-read data into the cache, where the pre-read container includes at least one unread file segment of the file. In this way, upon receiving a read request for the file subsequently sent by the client, the storage device may directly read the to-be-read data from the pre-read data in the cache, thereby reducing a time overhead in reading data. Because it is unnecessary to pre-read data of the entire file and store the data into the cache, storage space required by the cache is not large. The cache in this embodiment of the present invention may be a common memory. In some cases, the cache may be implemented by directly using an original memory in the storage system. Therefore, in this embodiment of the present invention, no additional hardware expenditure is required, thereby reducing hardware costs.

In addition, in this embodiment of the present invention, data pre-read from the at least one of the containers includes data in containers in which the predetermined number of unread file segments are located. Based on a file storage rule, the data in these containers may be to-be-read data requested by a next read request. Therefore, by simultaneously pre-reading into the cache all the data in the containers in which the predetermined number of file segments are located, the number of times that data is read from the first storage medium is reduced and file reading performance is improved.

Embodiment 8

Figure 10:
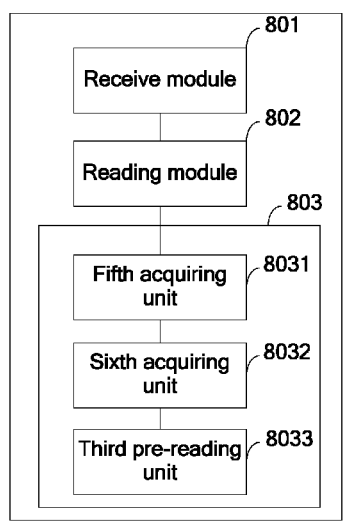

This embodiment of the present invention provides a file storage device, which is applicable to the file reading method provided in Embodiment 4. The storage device is configured to store a file, and the storage device includes a first storage medium and a cache. An access speed of the cache is greater than that of the first storage medium. The first storage medium has a plurality of containers. The file includes a plurality of file segments. Referring to FIG. 10, the storage device includes a receive module 801, a reading module 802, and a pre-reading module 803. Structures of the receive module 801 and the reading module 802 are the same as those of the receive module 701 and the reading module 702 in Embodiment 7, which are not described herein any further. However, a difference lies in that the pre-reading module 803 is configured to pre-read, from the first storage medium according to a sequence of serial numbers of containers in which a predetermined number of unread file segments are located, data in at least one of the containers in which the predetermined number of file segments are located, and store the pre-read data into the cache. The predetermined number of unread file segments are contiguous in the file, and the predetermined number of unread file segments are adjacent to file segments corresponding to to-be-read data in the file.

The pre-reading module 803 includes a fifth acquiring unit 8031, configured to acquire a first eptr, where the first eptr points to a last file segment in the file segments corresponding to the to-be-read data; a sixth acquiring unit 8032, configured to acquire, from an eptr table of the file, a predetermined number of eptrs that follow the first eptr; and a third pre-reading unit 8033, configured to pre-read, according to a sequence of serial numbers of containers in which file segments to which the acquired address pointers point are located, data in at least one of the containers in which the file segments to which the acquired address pointers point are located.

The first read request received by the receive module 801 is a read request that satisfies a pre-read trigger condition, where the pre-read trigger condition includes one or more of the following conditions: time when the storage device receives the first read request falls within a predetermined time period; the to-be-read data requested by the first read request does not exist in the cache, or a part of the to-be-read data requested by the first read request does not exist in the cache; and after the storage device reads the to-be-read data requested by the first read request, the number of unread file segments in the cache is less than a preset number.

The first read request received by the receive module 801 may include a name of the file, a start position of the to-be-read data, and data volume of the to-be-read data.

The first storage medium includes, but is not limited to, a magnetic disk, a flash memory, or a CD. The cache includes, but is not limited to, a memory.

The storage device provided in this embodiment of the present invention may achieve the following beneficial effects. Upon receiving the first read request sent by the client, the storage device pre-reads, from the first storage medium, the data in at least one of the containers, and stores the pre-read data into the cache, where the pre-read container includes at least one unread file segment of the file. In this way, upon receiving a read request for the file subsequently sent by the client, the storage device may directly read the to-be-read data from the pre-read data in the cache, thereby reducing a time overhead in reading data. Because it is unnecessary to pre-read data of the entire file and store the data into the cache, storage space required by the cache is not large. The cache in this embodiment of the present invention may be a common memory. In some cases, the cache may be implemented by directly using an original memory in a storage system. Therefore, in this embodiment of the present invention, no additional hardware expenditure is required, thereby reducing hardware costs.

In addition, in this embodiment, all the data in the at least one of the containers in the first storage medium is read according to the sequence of the serial numbers of the containers. Based on a file storage rule, during de-duplication of the original file, generally, file segments not stored in a de-duplication system are sequentially stored in the storage system according to the sequence of the serial numbers of the containers. Therefore, if the containers are also pre-read sequentially according to the sequence of the serial numbers of the containers, data pre-read from the containers may be to-be-read data requested by one or a plurality of next read requests. Therefore, according to this embodiment, an execution speed of a next read request may be improved, the number of times that data is read from the first storage medium is reduced, and file reading performance is improved. In addition, sequencing the containers according to the serial numbers and then performing pre-reading is simple in operation and easy to implement.

The sequence of the serial numbers of the containers may be in ascending order, and these serial numbers may be discontinuous. For example, during the pre-reading, if it is found by querying that the serial numbers of the containers in which the unread file segments are located are 10, 13, 15, 20, 21, and 40 respectively, containers to be pre-read this time may be selected from the six containers. Assuming that three containers are to be pre-read this time, the serial numbers of the containers to be pre-read are 10, 13, and 15 respectively.

Embodiment 9

Figures 11, 12:
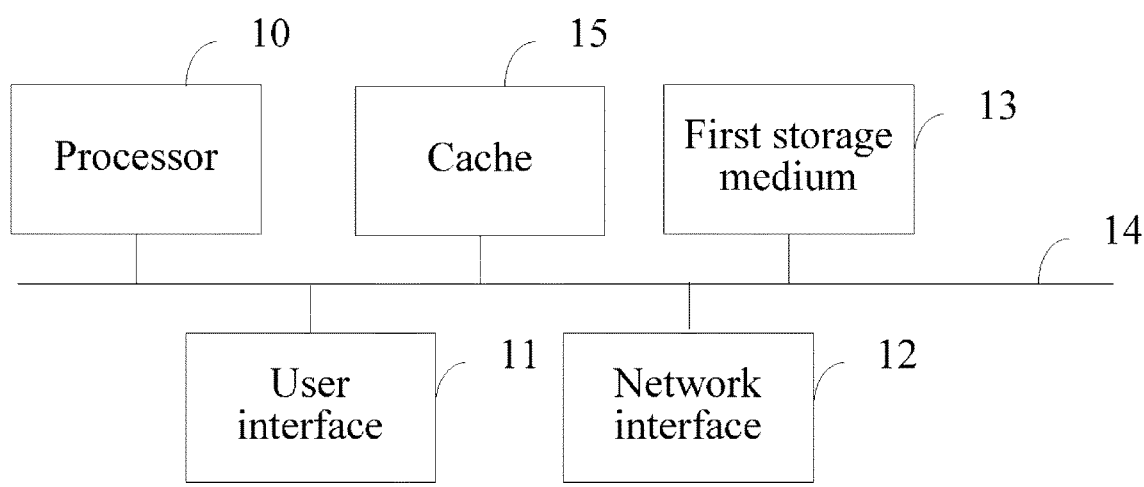
FIG. 11 is a schematic structural diagram of a specific implementation manner of a file storage device according to an embodiment of the present invention.
FIG. 12 is a schematic structural diagram of a file reading system according to an embodiment of the present invention.

This embodiment of the present invention provides a file storage device, where the device may be a computer (including a handheld computer system, for example, a smartphone or a tablet computer) or a server, as shown in FIG. 11. The device generally includes at least one processor 10 (for example, a central processing unit (CPU)), a user interface 11, at least one network interface 12 or another communications interface, a first storage medium 13, at least one communications bus 14, and a cache 15. A person skilled in the art may understand that a structure of the computer shown in FIG. 11 does not constitute any limitation to the computer, and instead the computer may include parts fewer or more than those shown in FIG. 11, or a combination of some parts, or parts disposed differently.

The following describes the constituent parts of the storage device in detail with reference to FIG. 11.

The communications bus 14 is configured to implement connection and communication between the processor 10, the first storage medium 13, the cache 15, and the communication interfaces.

The at least one network interface 12 (which may be wired or wireless) implements communication connection between the storage device and at least one other computer or server over the Internet, a wide area network, a local area network, a metropolitan area network, or the like.

The first storage medium 13 includes, but is not limited to, a magnetic disk, a flash memory, or a CD. The first storage medium 13 has a plurality of containers. The cache 15 includes, but is not limited to, a memory. An access speed of the cache 15 is greater than that of the first storage medium 13. The first storage medium 13 and the cache 15 may be configured to store software programs and application modules respectively. The processor 10 implements various functional applications and data processing of the storage device by running the software programs and the application modules stored in the first storage medium 13 and the cache 15. The first storage medium 13 and the cache may mainly include a program storage area and a data storage area respectively. The program storage area may store an operating system, an application program required by at least one function (for example, a file pre-reading function), and the like. The data storage area may store data created according to use of the storage device, and the like. In addition, the first storage medium 13 may include a non-volatile memory, for example, at least one disk storage component, a flash memory component, or another volatile solid state storage component. The cache 15 may include a memory.

The user interface 10 includes, but is not limited to, an output device and an input device. The input device generally includes a keyboard and a click device (for example, a mouse, a trackball, a touchpad, or a touchscreen). The output device generally includes a device capable of displaying computer information such as a display, a printer, and a projector. The display may be configured to display information entered by a user or files provided to the user. The keyboard and click device may be configured to receive entered digits or character information, and generate signal inputs related to user settings and function control of the storage device, for example, acquiring an operation instruction issued by the user according to an operation prompt.

The processor 10 is a control center of the storage device, and is connected to various parts of the entire storage device using various interfaces and lines, and implements various functions and data processing of the storage device to monitor the entire storage device, by running or performing the software programs and/or the application modules stored in the first storage medium 13 and the cache 15 and calling data stored in the first storage medium 13 and the cache 15.

By running or performing the software programs and/or the application modules stored in the first storage medium 13 and the cache 15 and calling the data stored in the first storage medium 13 and the cache 15, the processor 10 may implement the following: receive a first read request sent through the user interface 10 or the network interface 12, where to-be-read data requested by the first read request is a part of a file; read, from the cache 15, data that is of the to-be-read data and located in the cache 15, and read, from the first storage medium 13, data that is of the to-be-read data and not located in the cache 15; and pre-read, from the first storage medium 13, data in at least one of the containers, and store the pre-read data into the cache 15, where the pre-read container includes at least one unread file segment of the file.

In an implementation manner of this embodiment, the processor 10 may be configured to pre-read, from the first storage medium 13 and among containers in which a predetermined number of unread file segments are located, data in a container in which the number of the predetermined number of file segments is greater than a threshold, and store the pre-read data into the cache 15. The predetermined number of unread file segments are contiguous in the file, and the predetermined number of unread file segments are adjacent to file segments corresponding to the to-be-read data in the file.

In another implementation manner of this embodiment, the processor 10 may be configured to select, from the predetermined number of unread file segments, unread file segments in a container in which the number of unread file segments is not greater than the threshold, and pre-read the selected unread file segments and store the pre-read unread file segments into the cache 15.

In another implementation manner of this embodiment, the processor 10 may be configured to acquire a first eptr, where the first eptr points to a last file segment in file segments corresponding to the to-be-read data; acquire, from an eptr table of the file, a predetermined number of eptrs that follow the first eptr; collect, in containers in which file segments to which the acquired eptrs point are located, statistics for the number of times that the predetermined number of eptr point to each of the containers; determine whether the number of the times acquired by statistics collection is greater than the threshold, and if the number of the times acquired by statistics collection is greater than the threshold, pre-read data in a container in which the number of the times is greater than the threshold.

In another implementation manner of this embodiment, the processor 10 may be configured to pre-read, from the first storage medium 13, data in a container in which a predetermined number of unread file segments are located, and store the pre-read data into the cache 15. The predetermined number of unread file segments are contiguous in the file, and the predetermined number of unread file segments are adjacent to file segments corresponding to the to-be-read data in the file.

In another implementation of this embodiment, the processor may be configured to acquire a first eptr, where the first eptr points to a last file segment in file segments corresponding to the to-be-read data; using the first eptr as a start pointer, acquire, from an eptr table of the file, a predetermined number of eptrs that follow the first eptr; and pre-read data in a container in which the file segments to which the acquired eptrs point are located.

In another implementation manner of this embodiment, the processor 10 may be configured to pre-read, from the first storage medium 13 according to a sequence of serial numbers of containers in which a predetermined number of unread file segments are located, data in at least one of the containers in which the predetermined number of file segments are located, and store the pre-read data into the cache 15.

In another implementation manner of this embodiment, the processor 10 may be configured to acquire a first eptr, where the first eptr points to a last file segment in file segments corresponding to the to-be-read data; acquire, from an eptr table of the file, a predetermined number of eptrs that follow the first eptr; and pre-read, according to a sequence of serial numbers of containers in which file segments to which the acquired eptr point are located, data in at least one of the containers in which the file segments to which the acquired eptrs point are located.

In another implementation manner of this embodiment, the processor 10 may be configured to determine whether a last file segment in file segments corresponding to the to-be-read data is a last file of the file; and if the last file segment in the to-be-read data is not the last file segment of the file, acquire the first eptr.

In another implementation manner of this embodiment, the processor 10 may be configured to, in an eptr table of the file, take the first eptr as a start pointer, and determine whether the number of all eptrs that follow the first eptr is greater than a predetermined number; if the number of all the eptrs that follow the first eptr is greater than the predetermined number, acquire all the eptrs that follow the first eptr; and if the number of all the eptrs that follow the first eptr is not greater than the predetermined number, acquire the predetermined number of eptrs.

In another implementation manner of this embodiment, the first read request received by the receive module 10 is a read request that satisfies a pre-read trigger condition, where the pre-read trigger condition includes one or more of the following conditions: time when the storage device receives the first read request falls within a predetermined time period; the to-be-read data requested by the first read request does not exist in the cache 15, or a part of the to-be-read data requested by the first read request does not exist in the cache 15; and after the storage device reads the to-be-read data requested by the first read request, the number of unread file segments in the cache 15 is less than a preset number.

In another implementation manner of this embodiment, the first read request received by the processor 10 is a read request that satisfies a pre-read trigger condition, where the pre-read trigger condition includes one or more of the following conditions: time when the storage device receives the first read request falls within a predetermined time period; the to-be-read data requested by the first read request does not exist in the cache 15, or a part of the to-be-read data requested by the first read request does not exist in the cache 15; after the storage device reads the to-be-read data requested by the first read request, the number of unread file segments in the cache 15 is less than a preset number; and file segments corresponding to the to-be-read data requested by the first read request are unread file segments except the predetermined number of unread file segments during a previous pre-reading.

Optionally, the processor 10 is further configured to receive a second read request sent by the client, where to-be-read data requested by the second read request is a part of the file; read, from the cache 15, data that is of the to-be-read data requested by the second read request and that is located in the cache 15; and read, from the first storage medium 13, data that is of the to-be-read data requested by the second read request and that is not located in the cache 15.

The first read request received by the processor 10 may include a name of the file, a start position of the to-be-read data, and data volume of the to-be-read data. The data volume of the to-be-read data is a part of the entire data volume of the file.

Further, when an operation instruction issued by a user according to an operation prompt or issued using a direct click is acquired using an input device, the processor 10 may further perform an operation corresponding to the operation instruction acquired by the input device.

The storage device provided in this embodiment of the present invention may achieve the following beneficial effects. Upon receiving the first read request sent by the client, the storage device pre-reads, from the first storage medium, the data in at least one of the containers, and stores the pre-read data into the cache, where the pre-read container includes at least one unread file segment of the file. In this way, upon receiving a read request for the file subsequently sent by the client, the storage device may directly read the to-be-read data from the pre-read data in the cache, thereby reducing a time overhead in reading data. Because it is unnecessary to pre-read data of the entire file and store the data into the cache, storage space required by the cache is not large. The cache in this embodiment of the present invention may be a common memory. In some cases, the cache may be implemented by directly using an original memory in a storage system. Therefore, in this embodiment of the present invention, no additional hardware expenditure is required, thereby reducing hardware costs.

Embodiment 10

This embodiment of the present invention provides a file reading system. Referring to FIG. 12, the system includes a user equipment 1001 and a file storage device 1002.

The user equipment 1001 is configured to receive an original file restoration request from a user, and generate a plurality of read requests according to the original file restoration request; and send a read request to the storage device 1002. The read request may include, but is not limited to, a name of a file, a start position of to-be-read data, and data volume of the to-be-read data. A volume of the to-be-read data requested by one read request is a part of a total data volume of the file. It is obviously known that these read requests are all directed to the same file. That is, names of the files in these read requests are the same.

The storage device 1002 is the storage device described in Embodiment 5, 6, 7, or 8, which is not described herein any further.

The system provided in this embodiment of the present invention may achieve the following beneficial effects. Upon receiving a first read request sent by a client, the storage device pre-reads, from a first storage medium, data in at least one of the containers, and stores the pre-read data into a cache, where the pre-read container includes at least one unread file segment of the file. In this way, upon receiving a read request for the file subsequently sent by the client, the storage device may directly read the to-be-read data from the pre-read data in the cache, thereby reducing a time overhead in reading data. Because it is unnecessary to pre-read data of the entire file and store the data into the cache, storage space required by the cache is not large. The cache in this embodiment of the present invention may be a common memory. In some cases, the cache may be implemented by directly using an original memory in the storage system. Therefore, in this embodiment of the present invention, no additional hardware expenditure is required, thereby reducing hardware costs.

It should be noted that during file reading by the storage device provided in the foregoing embodiment, description is given only using division of the foregoing functional modules. In practice, the functions may be allocated to different functional modules for implementation as required. An internal structure of the device is divided into different functional modules to implement all or part of the functions described above. In addition, the storage device provided in the foregoing embodiments is based on the same inventive concept as the embodiments illustrating the file reading methods. For a specific implementation process, refer to the method embodiments, which are not described herein any further.

The sequence numbers of the preceding embodiments of the present invention are only for ease of description, but do not denote the preference of the embodiments.

A person of ordinary skill in the art may understand that all or a part of the steps of the embodiments may be implemented by hardware or a program instructing relevant hardware. The program may be stored in a computer readable storage medium. The storage medium may include a read-only memory, a magnetic disk, or an optical disc.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A file reading method applicable to reading of a file stored on a storage device, wherein the storage device comprises a first storage medium and a cache, wherein an access speed of the cache is greater than that of the first storage medium, wherein the first storage medium has a plurality of containers, wherein each container comprises a plurality of chunks, wherein the file comprises a plurality of file segments, and wherein one chunk is used for storing one file segment, the method comprising:
   receiving, by the storage device, a first read request sent by a client, wherein to-be-read data requested by the first read request is a part of the file;
   reading, from the cache, data that is of the to-be-read data and located in the cache;
   reading, from the first storage medium, data that is of the to-be-read data and not located in the cache;
   pre-reading, from the first storage medium, all data of at least one container, wherein the pre-read container stores unread file segments belonging to the file and a plurality of the segments that do not belong to the file, and wherein the number of the unread file segments belonging to the file is greater than a threshold; and
   storing the pre-read data into the cache.

2. The method according to claim 1 further comprising:
   selecting, from a predetermined number of unread file segments, unread file segments in a container in which the number of unread file segments is not greater than the threshold;
   pre-reading the selected unread file segments; and
   storing the pre-read unread file segments into the cache.

3. The method according to claim 1, wherein pre-reading the data in the container comprises:
   acquiring a first address pointer, wherein the first address pointer points to a last file segment in file segments corresponding to the to-be-read data;
   acquiring, from an address pointer table of the file, a predetermined number of address pointers that follow the first address pointer;
   collecting, in containers in which file segments to which the acquired address pointers point are located, statistics for the number of times that the predetermined number of address pointers point to each of the containers;
   determining whether the number of the times acquired by statistics collection is greater than the threshold; and
   pre-reading data in a container in which the number of the times is greater than the threshold when the number of the times acquired by statistics collection is greater than the threshold.

4. The method according to claim 3, wherein acquiring the predetermined number of address pointers that follow the first address pointer comprises:
   taking, in the address pointer table of the file, the first address pointer as a start pointer;
   determining whether the number of all address pointers that follow the first address pointer is not greater than a predetermined number;
   acquiring all the address pointers that follow the first address pointer when the number of all the address pointers that follow the first address pointer is greater than the predetermined number; and acquiring the predetermined number of address pointers when the number of all the address pointers that follow the first address pointer is not greater than the predetermined number.

5. The method according to claim 1, wherein the unread file segments belonging to the file are contiguous in the file.

6. The method according to claim 1, wherein pre-reading the data in the container comprises:
acquiring a first address pointer, wherein the first address pointer points to a last file segment in file segments corresponding to the to-be-read data;
acquiring, from an address pointer table of the file, a predetermined number of address pointers that follow the first address pointer; and
pre-reading data in a container in which file segments to which the acquired address pointers point are located.

7. The method according to claim 1, wherein pre-reading the data in the containers comprises pre-reading, from the first storage medium according to a sequence of serial numbers of containers in which a predetermined number of unread file segments are located, data in at least one of the containers in which the predetermined number of file segments are located.

8. The method according to claim 7, wherein pre-reading the data in the container comprises:
acquiring a first address pointer, wherein the first address pointer points to a last file segment in file segments corresponding to the to-be-read data;
acquiring, from an address pointer table of the file, a predetermined number of address pointers that follow the first address pointer; and
pre-reading, according to a sequence of serial numbers of containers in which file segments to which the acquired address pointers point are located, data in at least one of the containers in which the file segments to which the acquired address pointers point are located.

9. The method according to claim 1, wherein the first read request is a read request that satisfies a pre-read trigger condition, and wherein the pre-read trigger condition comprises one or more of the following conditions:
time when the storage device receives the first read request falls within a predetermined time period;
the to-be-read data requested by the first read request does not exist in the cache, or a part of the to-be-read data requested by the first read request does not exist in the cache; or
after the storage device reads the to-be-read data requested by the first read request, the number of unread file segments that are in the cache and pertain to the file is less than a preset number.

10. A file storage device configured to store a file, wherein the storage device comprises:
a processor;
a first storage medium; and
a cache,
wherein an access speed of the cache is greater than that of the first storage medium,
wherein each container is divided into a plurality of chunks,
wherein the first storage medium has a plurality of containers,
wherein each container divided into a plurality of chunks,
wherein the file comprises a plurality of file segments, and
wherein the processor is configured to:
receive a first read request sent by a client, wherein to-be-read data requested by the first read request s a part of the file;
read, from the cache, data that is of the to-be-read data and located in the cache;
read, from the first storage medium, data that is of the to-be-read data and not located in the cache;
pre-read, from the first storage medium, all data of at least one container, wherein the pre-read container stores unread file segments belonging to the file and segments that do not belong to the file, and wherein the number of the unread file segments belonging to the file is greater than a threshold; and
store the pre-read data into the cache.

11. The storage device according to claim 10, wherein the processor is further configured to:
select, from a predetermined number of unread file segments, unread file segments in a container in which the number of unread file segments is not greater than the threshold;
pre-read the selected unread file segments; and
store the pre-read unread file segments into the cache.

12. The storage device according to claim 10, wherein the processor being configured to pre-read all data of at least one container comprises the processor being configured to:
acquire a first address pointer, wherein the first address pointer points to a last file segment in file segments corresponding to the to-be-read data;
acquire, from an address pointer table of the file, a predetermined number of address pointers that follow the first address pointer; and
collect, in containers in which file segments to which the acquired address pointers point are located, statistics for the number of times that the predetermined number of address pointers point to each of the containers;
determine whether the number of the times acquired by statistics collection is greater than the threshold; and
pre-read data in a container in which the number of the times is greater than the threshold when the number of the times acquired by statistics collection is greater than the threshold.

13. The storage device according to claim 12, wherein the processor being configured to acquire the predetermined number of address pointers that follow the first address pointer comprises the processor being further configured to:
take, in the address pointer table of the file, the first address pointer as a start pointer;
determine whether the number of all address pointers that follow the first address pointer is not greater than a predetermined number;
acquire all the address pointers that follow the first address pointer when the number of all the address pointers that follow the first address pointer is greater than the predetermined number; and
acquire the predetermined number of address pointers when the number of all the address pointers that follow the first address pointer is not greater than the predetermined number.

14. The storage device according to claim 10, wherein the unread file segments belonging to the file are contiguous in the file.

15. The storage device according to claim 10, wherein the processor being configured to pre-read all of the data of the at least one container comprises the processor being configured to:
acquire a first address pointer, wherein the first address pointer points to a last file segment in file segments corresponding to the to-be-read data;

acquire, from an address pointer table of the file, a predetermined number of address pointers that follow the first address pointer; and pre-read data in a container in which file segments to which the acquired address pointers point are located.

16. The storage device according to claim 10, wherein the processor being configured to pre-read all of the data of the at least one container comprises the processor being configured to pre-read, from the first storage medium according to a sequence of serial numbers of containers in which a predetermined number of unread file segments are located, data in at least one of the containers in which the predetermined number of file segments are located.

17. The storage device according to claim 16, wherein the processor is further configured to:

acquire a first address pointer, wherein the first address pointer points to a last file segment in file segments corresponding to the to-be-read data;

acquire, from an address pointer table of the file, a predetermined number of address pointers that follow the first address pointer; and pre-read, according to a sequence of serial numbers of containers in which file segments to which the acquired address pointers point are located, data in at least one of the containers in which the file segments to which the acquired address pointers point are located.

18. The storage device according to claim 10, wherein the first read request received by the processor is a read request that satisfies a pre-read trigger condition, and wherein the pre-read trigger condition comprises one or more of the following conditions:

a time when the storage device receives the first read request falls within a predetermined time period;

the to-be-read data requested by the first read request does not exist in the cache, or a part of the to-be-read data requested by the first read request does not exist in the cache; or after the storage device reads the to-be-read data requested by the first read request, the number of unread file segments that are in the cache and pertain to the file is less than a preset number.

19. A file reading system comprising:

a user equipment; and a file storage device, wherein the user equipment is configured to:

receive an original file restoration request from a user;

generate a plurality of read requests according to the original file restoration request; and send the read request to the storage device, wherein the storage device is configured to store a file, wherein the storage device comprises a first storage medium and a cache, wherein an access speed of the cache is greater than that of the first storage medium, wherein the first storage medium has a plurality of containers, wherein each container is divided into a plurality of chunks, wherein the file comprises a plurality of file segments, wherein one chunk stores one file segment, wherein the storage device further comprises a processor, and wherein the processor is configured to:

receive a first read request sent by a client, wherein to-be-read data requested by the first read request is a part of the file;

read, from the cache, data that is of the to-be-read data and located in the cache;

read, from the first storage medium, data that is of the to-be-read data and not located in the cache;

pre-read, from the first storage medium, all data of at least one container, wherein the pre-read container stores unread file segments belonging to the file and segments that do not belong to the file; and store the pre-read data into the cache.

* * * * *

UNITED STATES PATENT AND TRADEMARK OFFICE
CERTIFICATE OF CORRECTION

PATENT NO. : 9,519,587 B2
APPLICATION NO. : 14/524407
DATED : December 13, 2016
INVENTOR(S) : Jian Wu It is certified that error appears in the above-identified patent and that said Letters Patent is hereby corrected as shown below:

In the Specification

Column 33, Lines 62 and 66 should read:
A file storage device configured to store a file, wherein the storage device comprises:
a processor;
a first storage medium; and
a cache,
wherein an access speed of the cache is greater than that of the first storage medium,
wherein each container is divided into a plurality of chunks,
wherein the first storage medium has a plurality of containers,
wherein each container is divided into a plurality of chunks,
wherein the file comprises a plurality of file segments, and
wherein the processor is configured to:
receive a first read request sent by a client, wherein to-be-read data requested by the first read request is a part of the file;
read, from the cache, data that is of the to-be-read data and located in the cache;
read, from the first storage medium, data that is of the to-be-read data and not located in the cache;
pre-read, from the first storage medium, all data of at least one container, wherein the pre-read container stores unread file segments belonging to the file and segments that do not belong to the file, and wherein the number of the unread file segments belonging to the file is greater than a threshold; and
store the pre-read data into the cache.

Signed and Sealed this
First Day of August, 2017

Joseph Matal
*Performing the Functions and Duties of the*
*Under Secretary of Commerce for Intellectual Property and*
*Director of the United States Patent and Trademark Office*